United States Patent [19]

Onuki et al.

[11] Patent Number: 5,231,445

[45] Date of Patent: Jul. 27, 1993

[54] IMAGE STABILIZING DEVICE FOR CAMERA

[75] Inventors: Ichiro Onuki, Kawasaki; Toshiyuki Kumakura, Tokyo, both of Japan

[73] Assignee: Canon Kabushiki Kaisha, Tokyo, Japan

[21] Appl. No.: 726,994

[22] Filed: Jul. 8, 1991

[30] Foreign Application Priority Data

| Jul. 9, 1990 | [JP] | Japan | 2-181168 |
| Aug. 8, 1990 | [JP] | Japan | 2-207985 |
| Dec. 14, 1990 | [JP] | Japan | 2-410516 |

[51] Int. Cl.$^5$ ............................................. G03B 7/00
[52] U.S. Cl. ..................................... 354/410; 354/430; 354/70
[58] Field of Search .......................... 354/410, 430, 70

[56] References Cited

U.S. PATENT DOCUMENTS

| 4,780,739 | 10/1988 | Kawakami et al. | 354/430 |
| 4,965,619 | 10/1990 | Shikaumi et al. | 354/410 |
| 5,012,270 | 4/1991 | Sekine et al. | 354/430 |
| 5,084,724 | 1/1992 | Maeno | 354/430 |
| 5,101,230 | 3/1992 | Shikaumi et al. | 354/430 |
| 5,107,293 | 4/1992 | Sekine et al. | 354/430 |
| 5,109,249 | 4/1992 | Kitagima | 354/430 |
| 5,117,246 | 5/1992 | Takahashi et al. | 354/430 |

*Primary Examiner*—Russell E. Adams
*Attorney, Agent, or Firm*—Robin, Blecker, Daley & Driscoll

[57] ABSTRACT

An image stabilizing device for a camera includes an image stabilizing means for preventing an image blur of the camera and a control means for changing a function of the image stabilizing means in accordance with a photometry or focus mode of the camera.

38 Claims, 27 Drawing Sheets

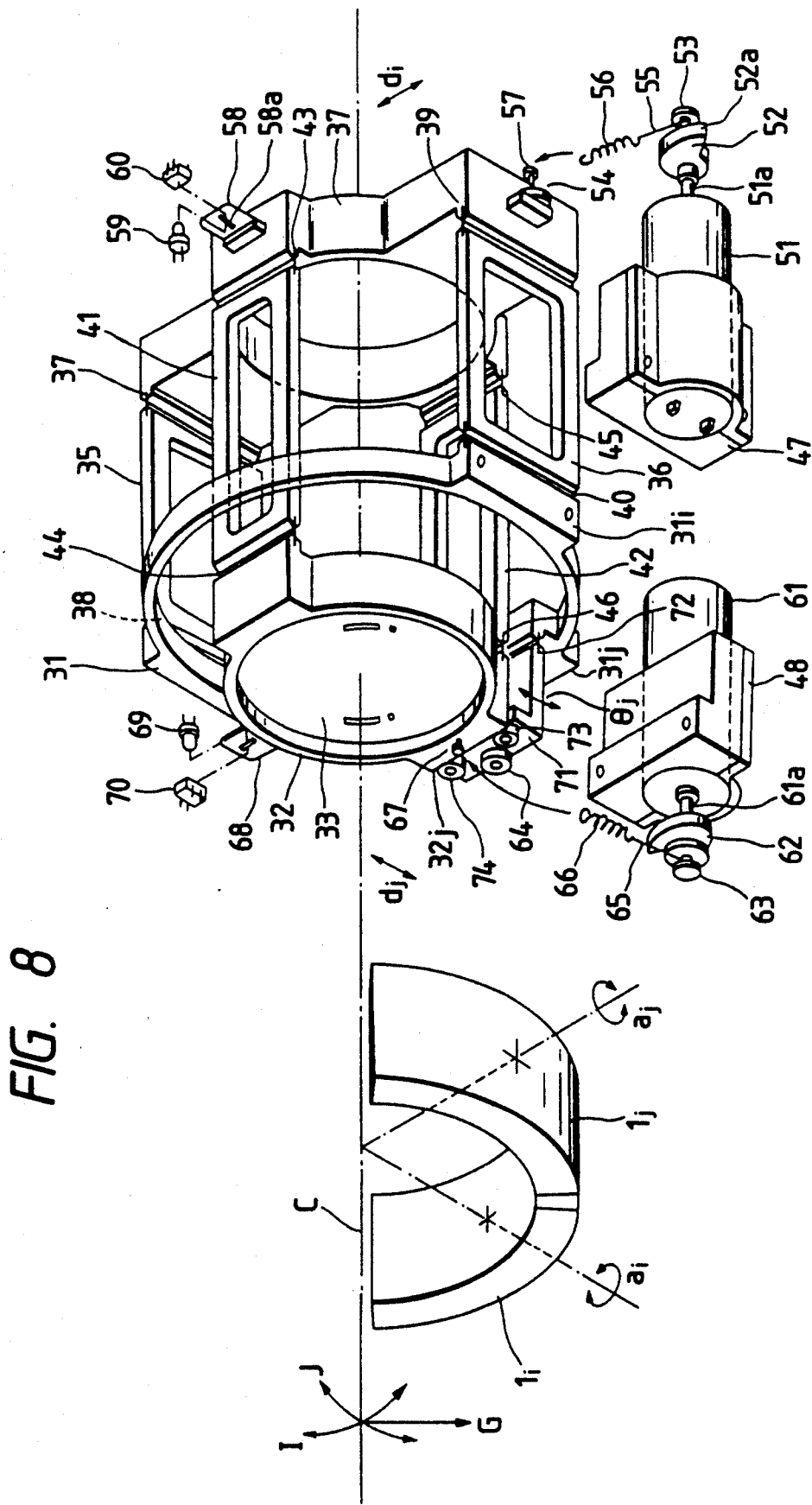

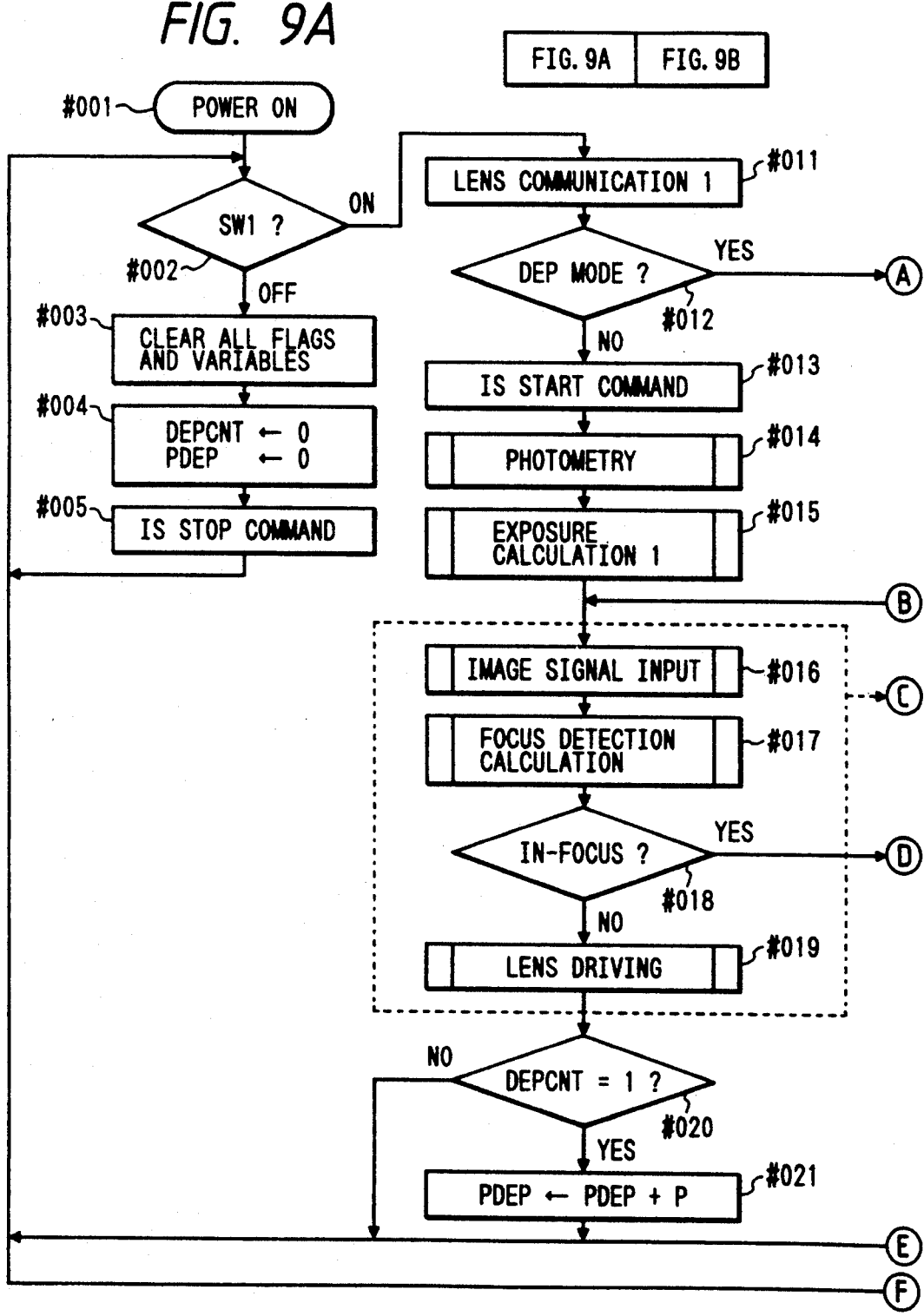

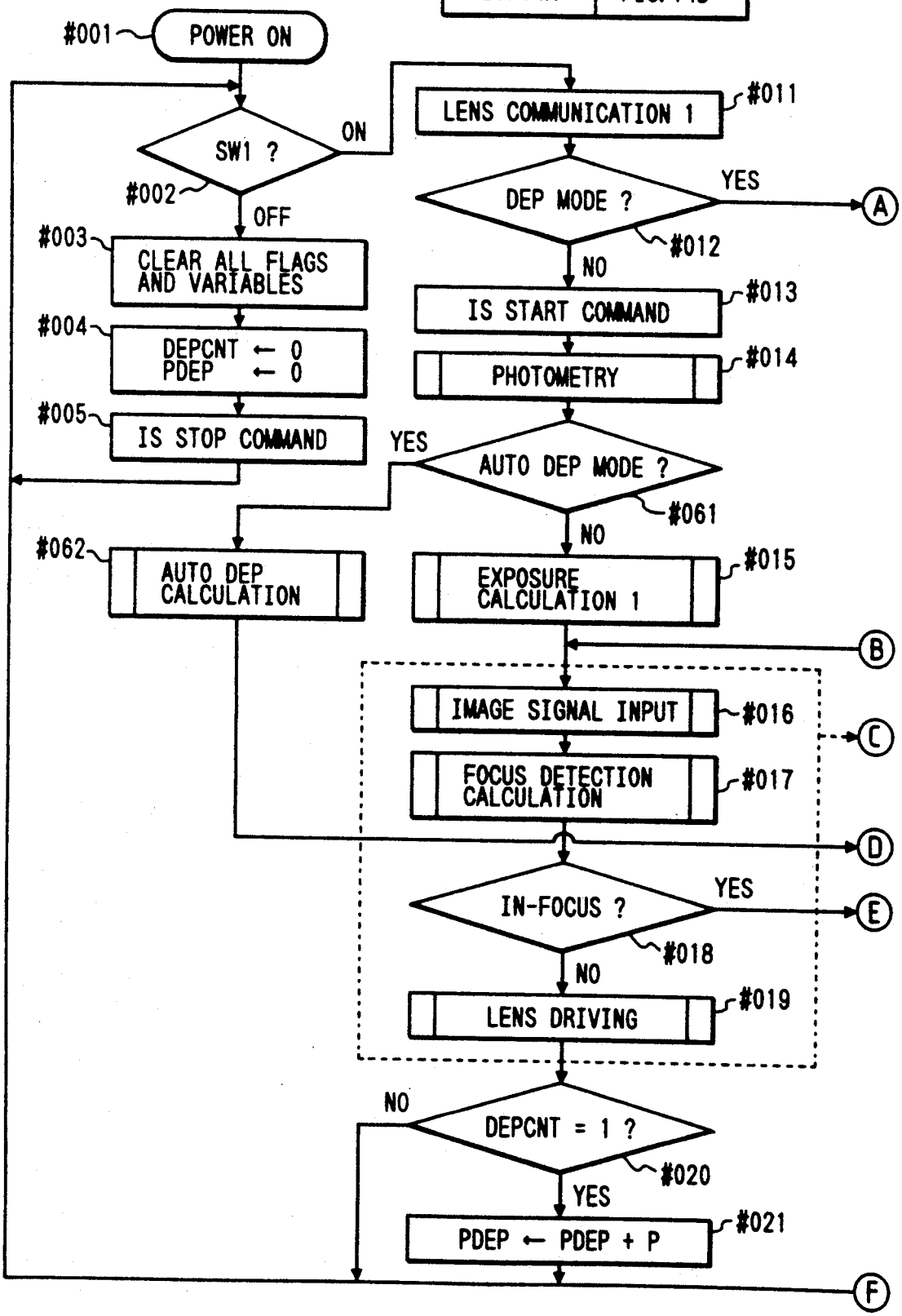

ONE-SHOT AF

SERVO AF

MOVING OBJECT ANTICIPATE SERVO AF

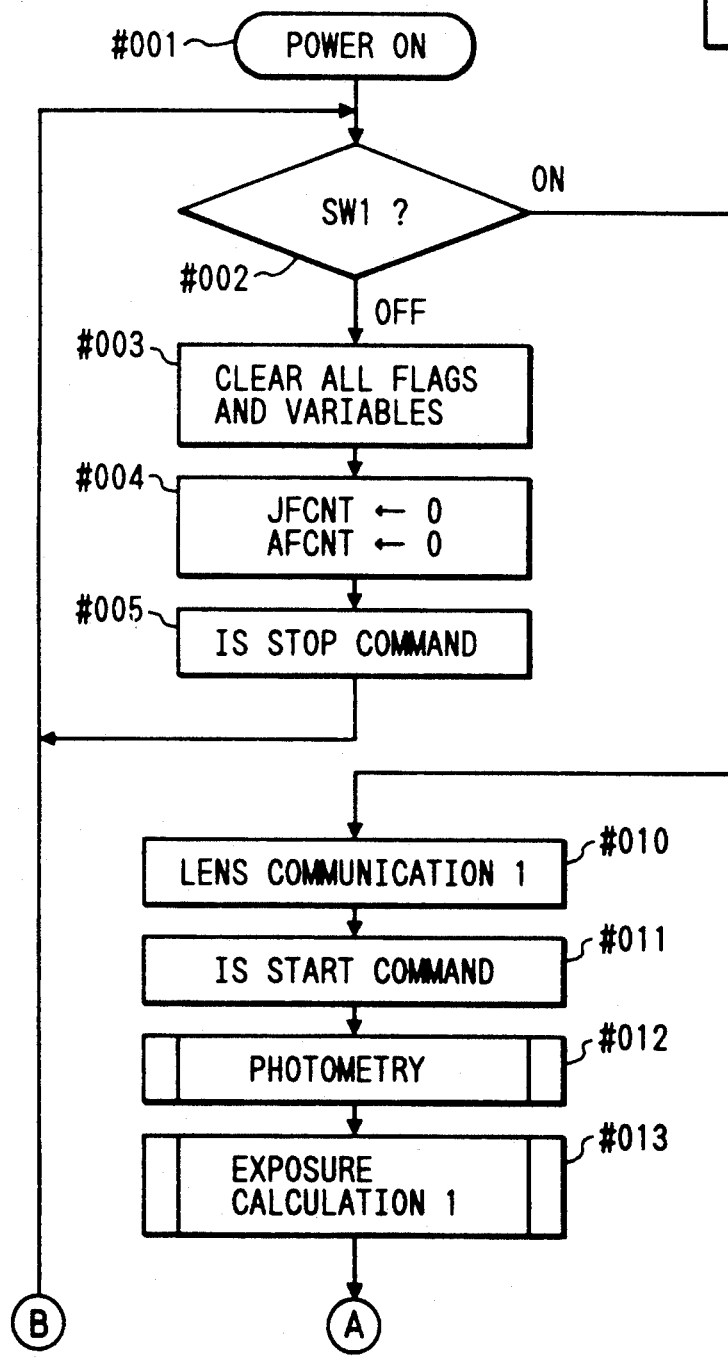

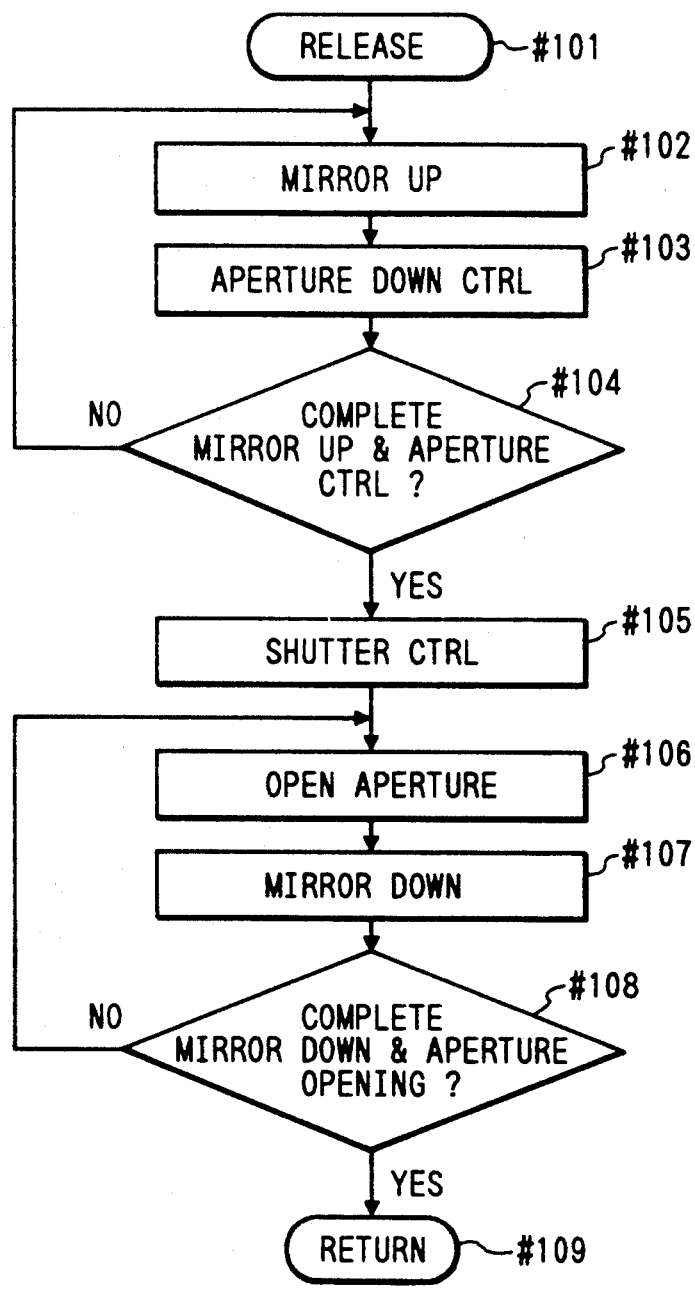

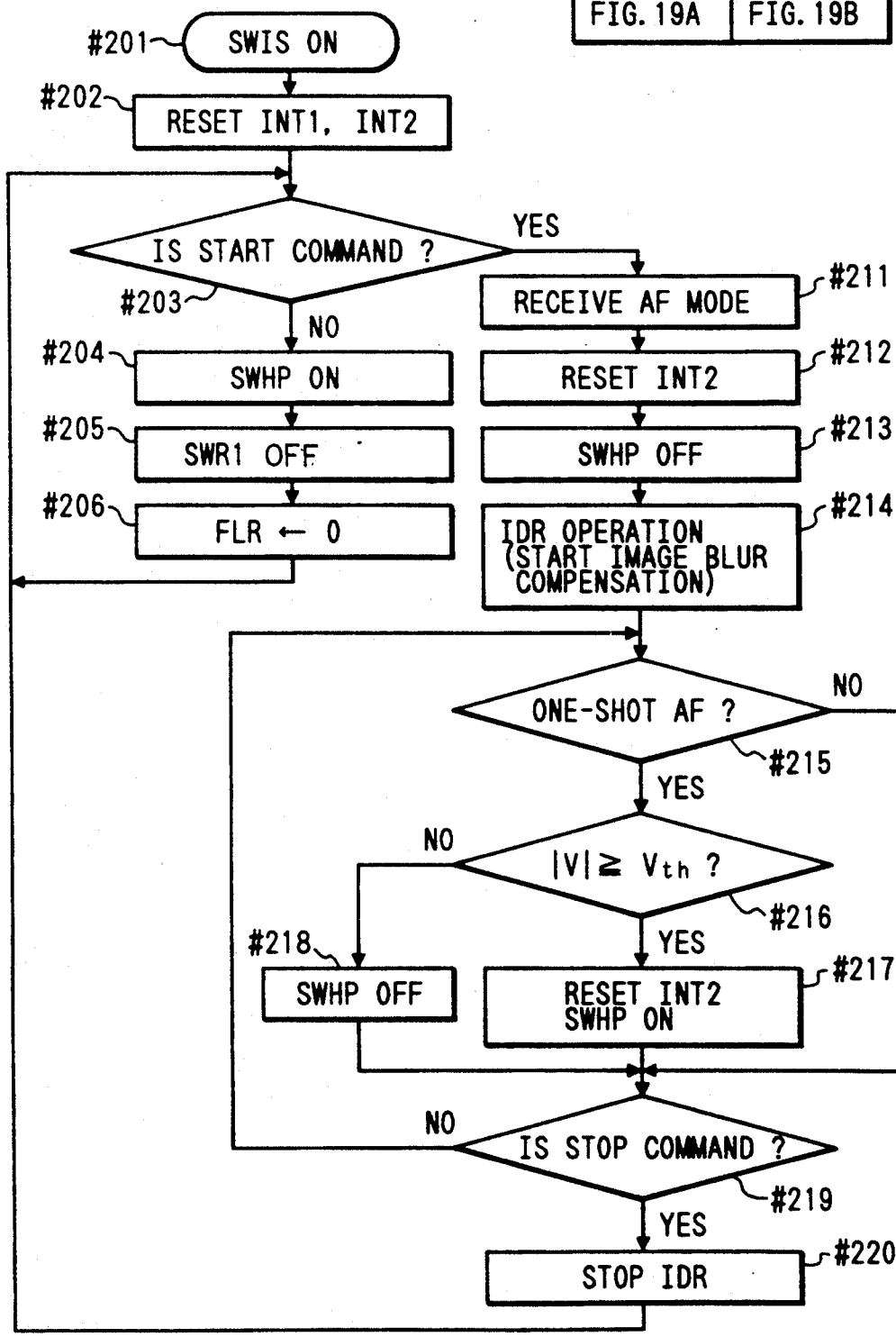

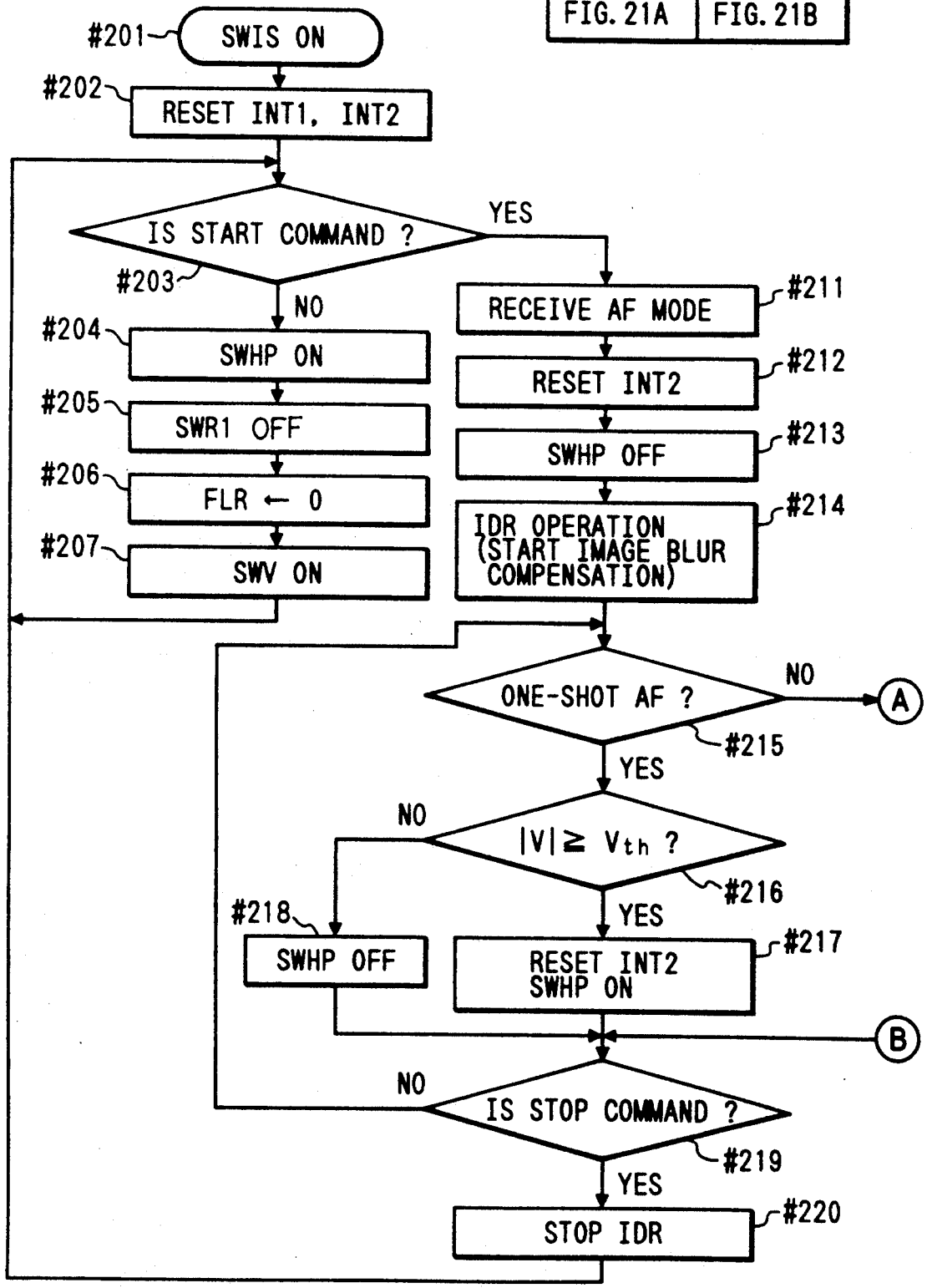

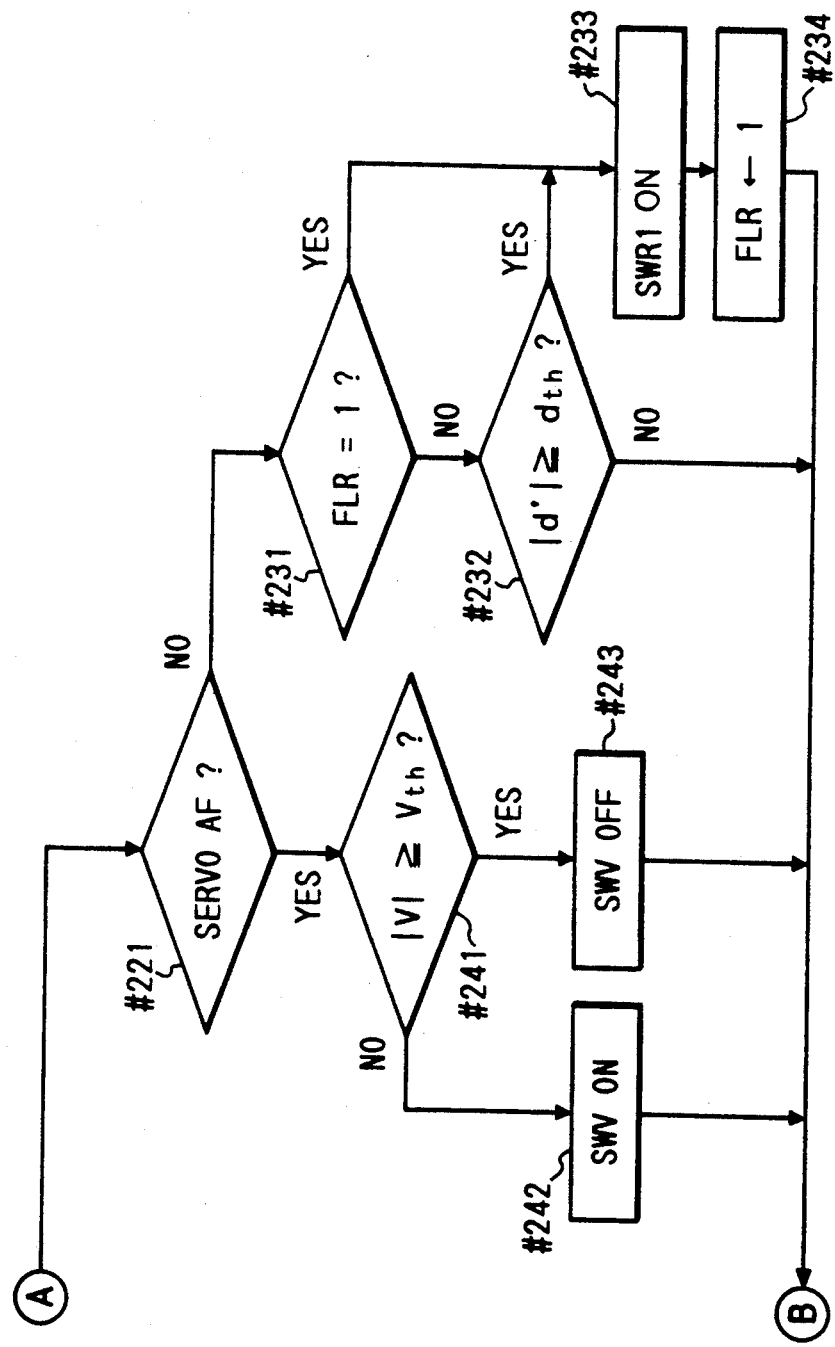

SERVO AF

MOVING OBJECT ANTICIPATION SERVO AF

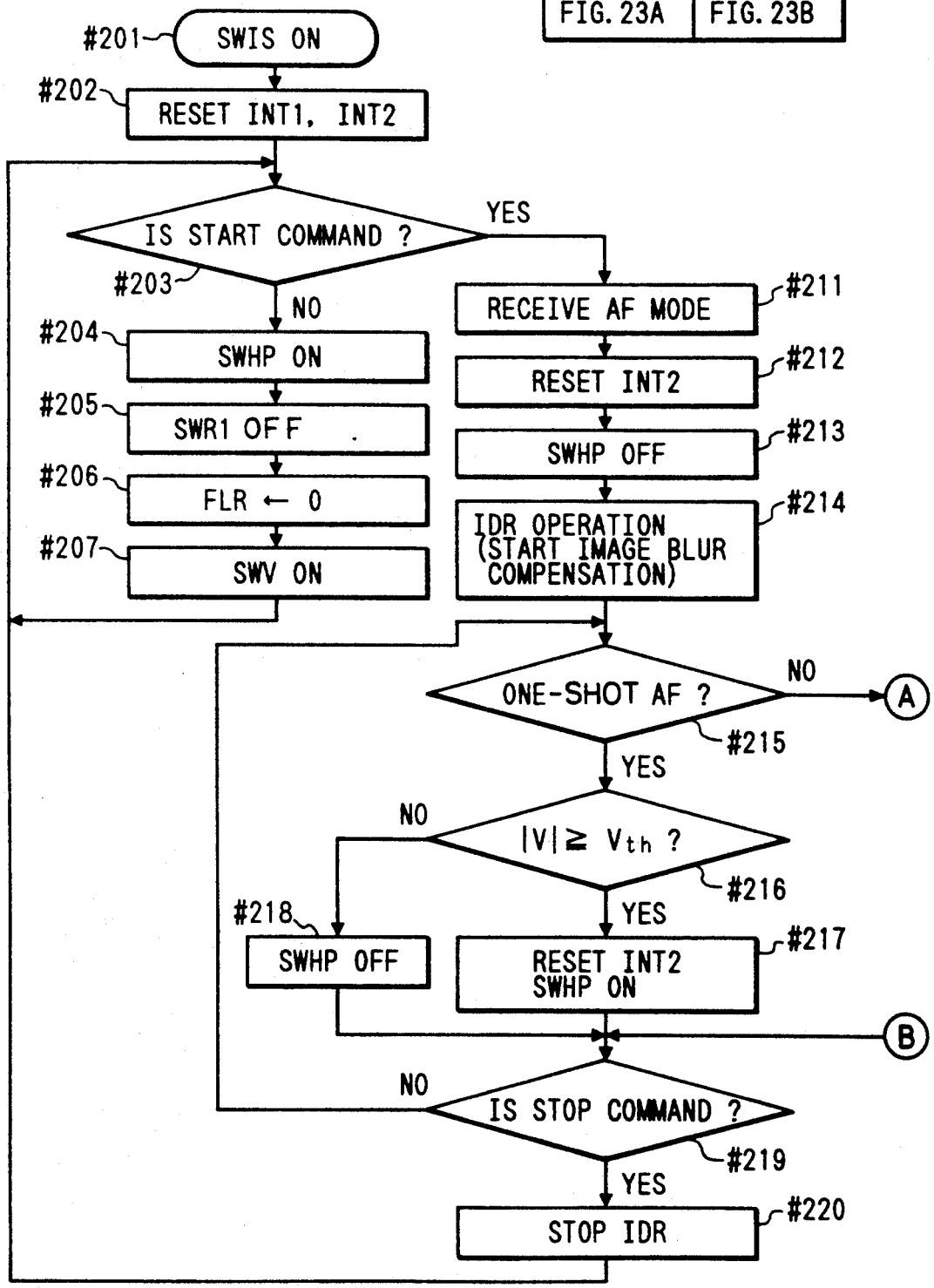

IMAGE STABILIZING DEVICE FOR CAMERA

BACKGROUND OF THE INVENTION

1. Field of the Invention

The present invention relates to an improvement of an image stabilizing device for a camera, capable of preventing an image blur caused by a hand shake (or vibration).

2. Related Background Art

Various types of conventional image blur compensation devices have been proposed, as disclosed in Japanese Laid-Open Patent Application No. 63-49729.

In order to prevent an image blur on a focusing plane, which blur is originated by a hand vibration, an optical axis eccentric means as a target control object is moved by a feedback control mechanism to suppress the image blur.

For example, a hand vibration (normally an oblique vibration of a camera with respect to a photographic optical axis) of the camera is detected as an acceleration signal, the acceleration signal is integrated by a signal processing system to obtain a velocity signal (and then a deviation signal), and the optical axis eccentric means is driven in a direction to suppress the camera vibration (i.e., a direction to suppress the image blur).

FIG. 25 shows a basic arrangement of an image blur compensation device including the above signal processing system. The image blur compensation device includes an acceleration detector 101 for detecting an oblique movement of a camera (not shown) with respect to the photographic optical axis of the camera as an acceleration signal a. The detected acceleration signal a is integrated into a velocity signal v by a first integrator 102. The velocity signal v is converted into a deviation signal d by a second integrator 103.

An actuator 105 is operated to drive a radially movable optical axis eccentric means 104 (normally a focusing lens system) of the camera in accordance with the deviation signal d.

A position sensor 106 constitutes a position detecting means for detecting an actual deviation of the optical axis eccentric means 104. A signal from the position sensor 106 is fed back to an input system of the actuator 105 through an operational amplifier 107, thereby forming a feedback loop for causing driving control to correspond to the vibration deviation.

On the other hand, various proposals have been made for photometry systems and autofocus (AF) systems for cameras.

Known photometry systems are a system having an average photometry mode for performing uniform photometry on the entire frame, a system having a spot photometry mode for performing photometry of only the central portion of the frame, and a system having an evaluative photometry mode for performing photometry with optimal weighting on the basis of conditions such as a back light state and a main object position.

When the image blur compensation device is combined with the above photometry modes, their effects cannot often be sufficiently enhanced.

More specifically, in the spot photometry mode, a photographer or user usually performs spot photometry of a main object and retries framing to obtain a desired frame. At this time, when an image blur compensation function mode is set, the compensation function is effected because a slight change in framing is detected as a hand vibration. As a result, current framing cannot be changed, or a desired frame cannot be obtained.

The following AF modes are proposed for the above AF system:

1) One-shot AF (or single AF): AF inhibited once an in-focus state is obtained;
2) Servo AF (or continuous AF): AF performed repeatedly; and
3) Moving object anticipation servo AF: AF performed to compensate for an AF tracking delay occurring in a high-speed moving object during a release operation during an AF operation.

However, when the image blur compensation device is combined with an autofocus device (AF device), and this combination is applied to a camera or the like, the effect of the combination cannot often be sufficiently enhanced. In order to distinguish a hand vibration of a photographer from panning or a change in framing in the image blur compensation device, types of blurs are classified to estimate a photographer's intention. Processing such as a change in blur compensation range is performed on the basis of this estimation, thereby improving operability.

When a camera having a plurality of AF modes is used in a given AF mode, framing unique to the given AF mode is often performed. For example, the following operations may be assumed.

1) Since a stationary object is often focused in the one-shot AF mode, a hand vibration is generally discriminated in this mode.
2) Since an irregularly moving object is traced in the servo AF mode, a change in framing is large.
3) Since an object moving in one direction is focused in a moving object anticipation servo AF mode, a camera movement is one-directional camera movement, i.e., panning.

In the conventional arrangement, blur actions in the above AF modes are not estimated, and the photographer's intention is estimated from only a blur signal. As a result, the conventional arrangement is not necessarily convenient.

Many applications relating to AF devices and autoexposure (AE) devices have been made. Of these applications, there is provided a device utilizing the AF and AE devices to determine focus and aperture states so that a plurality of different objects are focused. For example, in Japanese Laid-Open Patent Application No. 63-85722 filed by the present applicant, a photographic lens is shifted to focus an object at the first distance by an AF device, and focus detection is performed for an object at the second distance. A defocus amount at the second distance with respect to the first distance is obtained, and an aperture value and a focus position are obtained so that the first and second objects are set in the in-focus state. The focus control lens position and the aperture value are controlled on the basis of the operation result, and photographing is performed. A photograph focused on both the objects at different distances can be obtained. This exposure control mode is called a depth priority AE mode.

When the image blur compensation device is used in combination with the depth priority AE mode, their effects cannot often be sufficiently enhanced.

When many functions such as image blur compensation, focus control, and exposure control are automated, it is important to determine the first operation of each function in consideration of the operability of the camera. In general, each function is selected in an automatic or manual mode, and then one operation member such as a switch turned on upon depression of, e.g., a release button to the half stroke is used as a trigger switch for starting all the functions. However, in the depth priority mode, at least two focus detection operations are performed in the depth priority mode, and a change in framing is performed every detection. An image blur detector in the image blur compensation device detects a change in framing as a large blur. A large deviation signal is generated in the blur detector after a change in framing occurs. When the release button is depressed to perform focus detection in this state, the image blur compensation device is operated. Accurate image blur compensation cannot be performed by the large deviation signal in the image blur detector. In addition, an object cannot be caught within the focus detection frame due to an abnormal behavior of the image blur compensation mechanism. Therefore, accurate focus detection cannot be performed.

SUMMARY OF THE INVENTION

The present invention has been made in consideration of the above situation, and has as its object to provide an image stabilizing device for a camera, comprising an image stabilizing means for preventing an image blur of the camera and a control means for changing a function of the image stabilizing means in accordance with a camera photometry mode or a focus mode, thereby performing an appropriate image stabilizing operation corresponding to the camera photometry or focus mode.

The above and other objects, features, and advantages of the present invention will be apparent from the following detailed description of the invention in conjunction with the accompanying drawings.

BRIEF DESCRIPTION OF THE DRAWINGS

FIG. 8 is a perspective view showing a compensation optical mechanism in the fourth embodiment;

FIGS. 9, 9A, 9B, 10, 11 and 12 are flow charts showing operations of the fourth embodiment;

FIGS. 14, 14A and 14B are flow charts showing an operation of the main part of the fifth embodiment;

FIGS. 17, 17A, 17B, 18, 19, 19A and 19B are flow charts showing operations of these AF modes;

FIGS. 21, 21A and 21B are flow charts showing an image blur compensation operation of the seventh embodiment;

FIGS. 23, 23A and 23B are flow charts showing an image blur compensation operation of the eighth embodiment of the present invention;

DETAILED DESCRIPTION OF THE PREFERRED EMBODIMENTS

Preferred embodiments of the present invention will be described with reference to the accompanying drawings.

Figure 1:
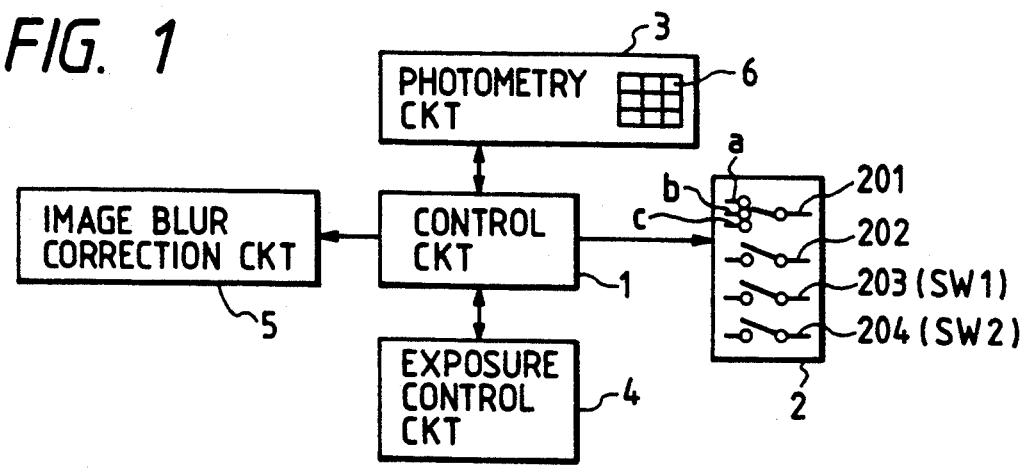
FIG. 1 is a block diagram showing a circuit arrangement of the first embodiment of the present invention.

FIG. 1 is a block diagram showing an overall arrangement of a camera having an image stabilizing function according to the first embodiment of the present invention.

Referring to FIG. 1, a control circuit 1 includes a microcomputer for controlling the overall operation of the camera.

Switches 2 are used to enter various inputs to the camera and comprise switches 201 to 204. The switch 201 serves as a photometry mode selection switch. When a contact a of the switch 201 is selected, the spot photometry mode is set. When a contact b of the switch 201 is connected, an average photometry mode is set. When a contact a of the switch 201 is selected, an evaluate photometry mode is set. The switch 202 serves as a spot photometry button. When this button is turned on, a spot photometry value is input. The switch 203 serves as a switch corresponding to a half stroke of the release button of the camera and is referred to as an SW1 hereinafter. The switch 204 serves as a switch corresponding to a full stroke of the release button and is referred to as an SW2 hereinafter.

A photometry circuit 3 A/D-converts an output from a sensor array 6 (to be described later) and outputs it as a photometry value to the control circuit 1. The sensor array 6 has a sensor layout corresponding to frame divisions. In the spot photometry mode, only photometry information of only the central pixel (sensor) of the sensor array 6 is utilized. In the average photometry mode, an average value of all the pixels is utilized. In the evaluative photometry mode, photometry values of all the pixels are input and a final photometry value is determined upon appropriate weighting of the input photometry values.

An exposure control circuit 4 performs aperture control and shutter control under a command from the control circuit 1.

An image blur compensation circuit 5 compensates an image blur.

Figure 2:
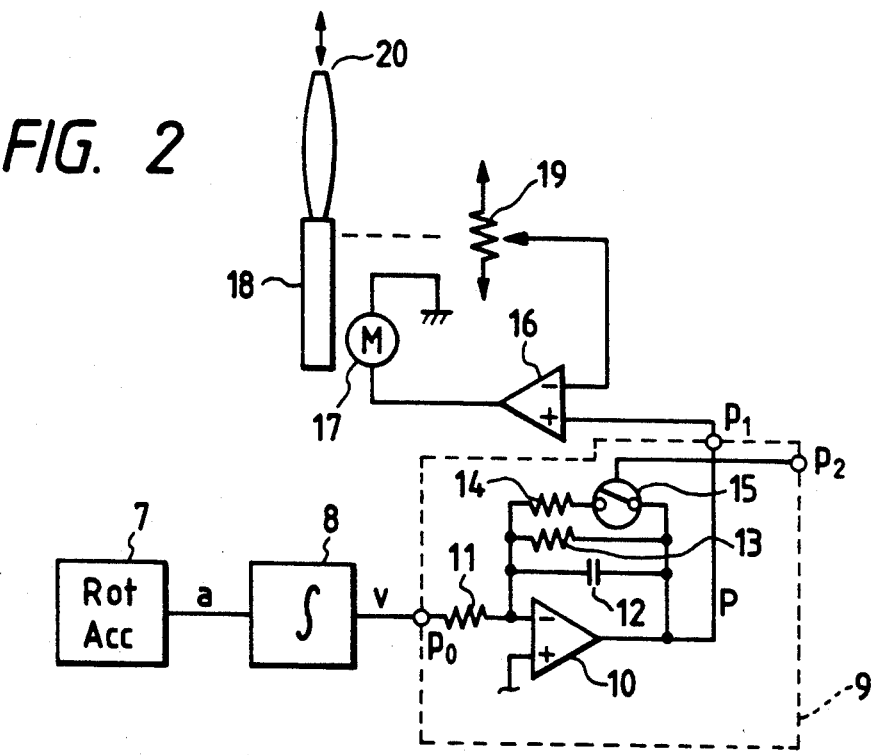
FIG. 2 is a circuit diagram showing a detailed arrangement of an image blur compensation control circuit shown in FIG. 1.

FIG. 2 is a circuit diagram showing an internal arrangement of the image blur compensation control circuit 5.

Referring to FIG. 2, an angular acceleration sensor (Rot Acc) 7 detects a hand vibration amount. The angular acceleration sensor 7 outputs an angular acceleration signal a corresponding to the hand vibration. The angular acceleration signal a is converted into a hand vibration angular velocity signal v by an integrator 8. The angular velocity signal v is input to a variable frequency integrator 9. The integrator 9 comprises resistors 11, 13, and 14, a capacitor 12, a semiconductor switch 15, and an operational amplifier 10. The angular velocity signal a as an output from the integrator 8 is input to the variable frequency integrator 9 through an input terminal p0 and is converted into an angular deviation signal p. The angular deviation signal a is input to an operational amplifier 16 from an output terminal pl. An input terminal p2 of the integrator 9 serves as a terminal which receives a control signal from the control circuit 1 shown in FIG. 1. When a control signal of high level is input to the integrator 9, the semiconductor switch 15 is turned on, so that the cutoff frequency of the integrator 9 is changed from $f1=1/(2\pi R13 \cdot C)$ to $f2=(R13+R14)/(2\pi \cdot R13 \cdot R14 \cdot C)$.

A system 18 converts rotation of a motor 17 into linear movement and is constituted by a rack and a pinion. A shift lens 20 is arranged in a photographic lens to perform hand vibration compensation. The shift lens 20 is vertically shifted to bend a photographic beam. A variable resistor 19 detects a movement amount of the shift lens 20. The operational amplifier 16 performs servo control to drive the motor until the value of the variable resistor 19 coincides with an input angular deviation.

The image blur compensation control circuit 5 therefore detects a hand vibration amount and drives the shift lens 20 in a direction opposite to a hand vibration direction so as to cancel an image blur occurring on a film image by a hand vibration, thereby stabilizing the image.

The operation of the control circuit 1 in FIG. 1 will be described with reference to a flow chart in FIG. 3.

It is determined in step #1 whether the switch SW1 is ON. If YES in step #1, the flow advances to step #8. Otherwise, the flow advances to step #2.

It is determined in step #2 whether the spot photometry switch 202 is ON. If NO in step #2, the flow returns to step #1. If YES in step #2, however, the flow advances to step #3.

It is determined in step #3 whether the photometry mode is the spot photometry mode. This is determined whether the contact a of the switch 201 is selected. As a result, if the contact a is selected, the flow advances to step #4. Otherwise, the flow advances to . step #7.

An operation range of image blur compensation is set to a high operation range in step #4. This can be achieved such that the input terminal p2 in FIG. 2 is set at high level to turn on the semiconductor switch 15. The cutoff frequency of the integrator 9 is set to a high-frequency side, so a hand vibration at a low frequency is not input.

Of all pieces of information of the pixels sent from the photometry circuit 3, the value of the central portion corresponding to spot photometry is input in step #5.

Since the spot photometry value is input, a flag FS is set at "1" in step #6, and the flow returns to step #1.

It is determined in step #3 that the spot photometry mode is not selected, the flow advances to step #7, as described above.

The flag FS representing whether the spot photometry value is input is reset to "0" in step #7.

If it is determined in step #1 that the switch SW1 is ON, the flow advances to step #8.

The operation range of image blur compensation is set to a low operation range in step #8. In this case, opposite to the operation described above, the input terminal p2 in FIG. 2 is set at low level to turn off the semiconductor switch 15. Therefore, the cutoff frequency of the integrator 9 is set to a low-frequency side, thereby inputting even a low-frequency hand vibration.

It is determined in step #9 whether the spot photometry mode is set. If YES in step #9, the flow advances to step #10. Otherwise, the flow advances to step #11.

In order to determine whether the spot photometry value is already input, the state of the flag FS is checked in step #10. If the spot photometry value is already input, the FS=1 is established, so that the flow advances to step #14. However, if FS=0, then the spot photometry value is not input, and the flow advances to step #13.

If it is determined in step #9 that the spot photometry mode is not set, the flow advances to step #11, as described above.

It is determined in step #11 whether the average photometry mode is set. This is checked by determining whether the contact b of the switch 201 in FIG. 1 is selected. If the contact b is selected, the flow advances to step #12. Otherwise, the flow advances to step #13.

An average photometry value is input in step #12. This is performed by obtaining an average value of photometry amounts of all pixels sent from the photometry circuit 3, as described above. The flow then advances to step #14.

Since it is determined in step #11 that the average photometry mode is not set, the current photometry mode is the evaluate photometry mode and an evaluate photometry value is input in step #13. This is performed after photometry amounts of all the pixels are appropriately weighted. The flow then advances to step #14.

In step #14, a shutter speed or time value and an aperture value are calculated on the basis of the spot photometry value input in step #5, the average photometry value input in step #12, or the evaluative photometry value input in step #13.

It is determined in step #15 whether the switch SW2 is ON. If YES in step #15, the flow advances to step #16. Otherwise, the flow returns to step #1.

Exposure control is performed in step #16. This can be performed by shutter control and aperture control performed on the basis of the time value and the aperture value determined in step #14.

When exposure control is completed, the flag FS is reset to "0" in step #17, and the flow returns to step #1.

In the first embodiment, when "FS=0" is established, i.e., when the spot photometry value is not input, although the spot photometry mode is set in step #10, the evaluate photometry mode is set to determine a photometry value. In order to input the spot photometry value, the spot photometry button or switch 202 is turned on before the switch SW1 is depressed, thereby fetching the photometry amount.

As in the first embodiment, after the spot photometry button 202 is turned on, image blur compensation is performed such that only a high-frequency component is passed. In this case, hand vibration compensation is not performed for a low-frequency component such as a change in framing. The first embodiment can quickly cope with framing desired by a photographer after the spot photometry is completed. Since a low-frequency component can be passed upon depression of the switch SW1, the image blur compensation range can be widened to a low-frequency range, thereby improving operability of the camera.

Figure 4:
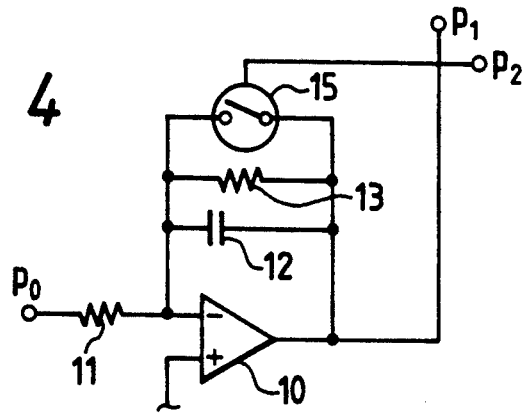
FIG. 4 is a circuit diagram showing the main part of the second embodiment of the present invention.
Figure 5:
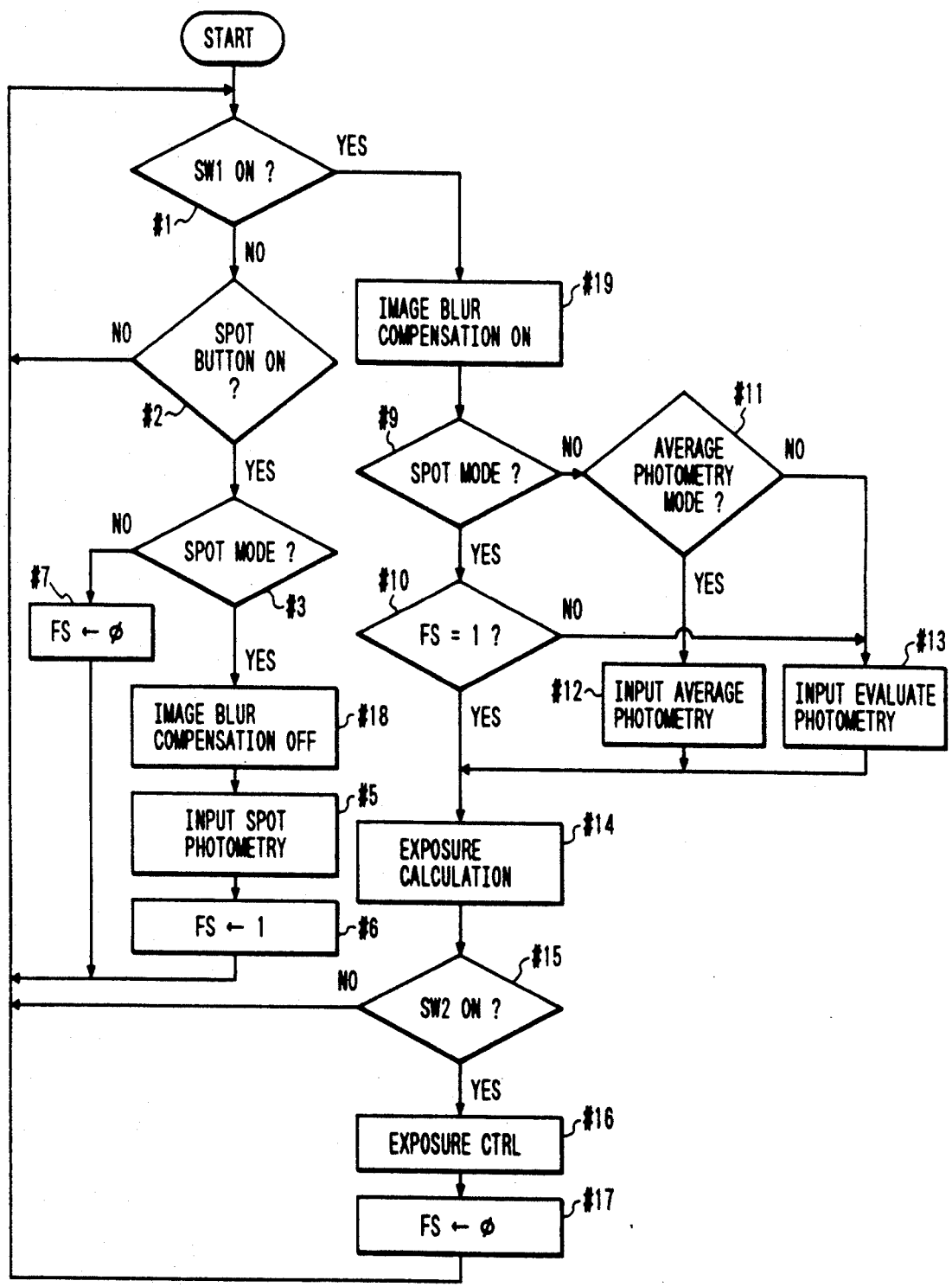
FIG. 5 is a flow chart showing an operation of the second embodiment of the present invention.

FIGS. 4 and 5 are a circuit diagram and a flow chart, respectively, showing the second embodiment of the present invention.

In the first embodiment, the image blur compensation range is shifted to a high-frequency range in the spot photometry mode. In the second embodiment, however, an image blur compensation operation is interrupted in the spot photometry mode. When a switch SW1 is turned on, the image blur compensation operation is started to obtain the same effect as in the first embodiment.

FIG. 4 shows an arrangement of a means for interrupting the image blur compensation operation. The angular deviation conversion integrator 9 in FIG. 2 of the first embodiment is replaced with another arrangement, and other arrangements are the same as those in the first embodiment.

When an input terminal p2 is set at high level, a semiconductor switch 15 is turned on, and a feedback loop of an operational amplifier 10 is short-circuited. The circuit in FIG. 4 does not serve as an integrator. In this case, the circuit in FIG. 4 continuously outputs a predetermined value and does not respond to a velocity input. In other words, a shift lens 20 is fixed to a predetermined position and is no longer sensitive to a hand vibration.

FIG. 5 is the flow chart for realizing the above operation. The basic operation flow of FIG. 5 is the same as that of FIG. 3, except that operations in steps #4 and #8 in FIG. 3 are replaced with operations in steps #18 and #19 in FIG. 5. More specifically, in step #18, as described above, the semiconductor switch 5 is turned on so that the integrator 9 is no longer operated as an integrator. In step #19, upon turn-ON operation of the switch SW1, the semiconductor switch 15 is turned off so that the integrator 9 can be operated as an integrator again.

Figure 6:
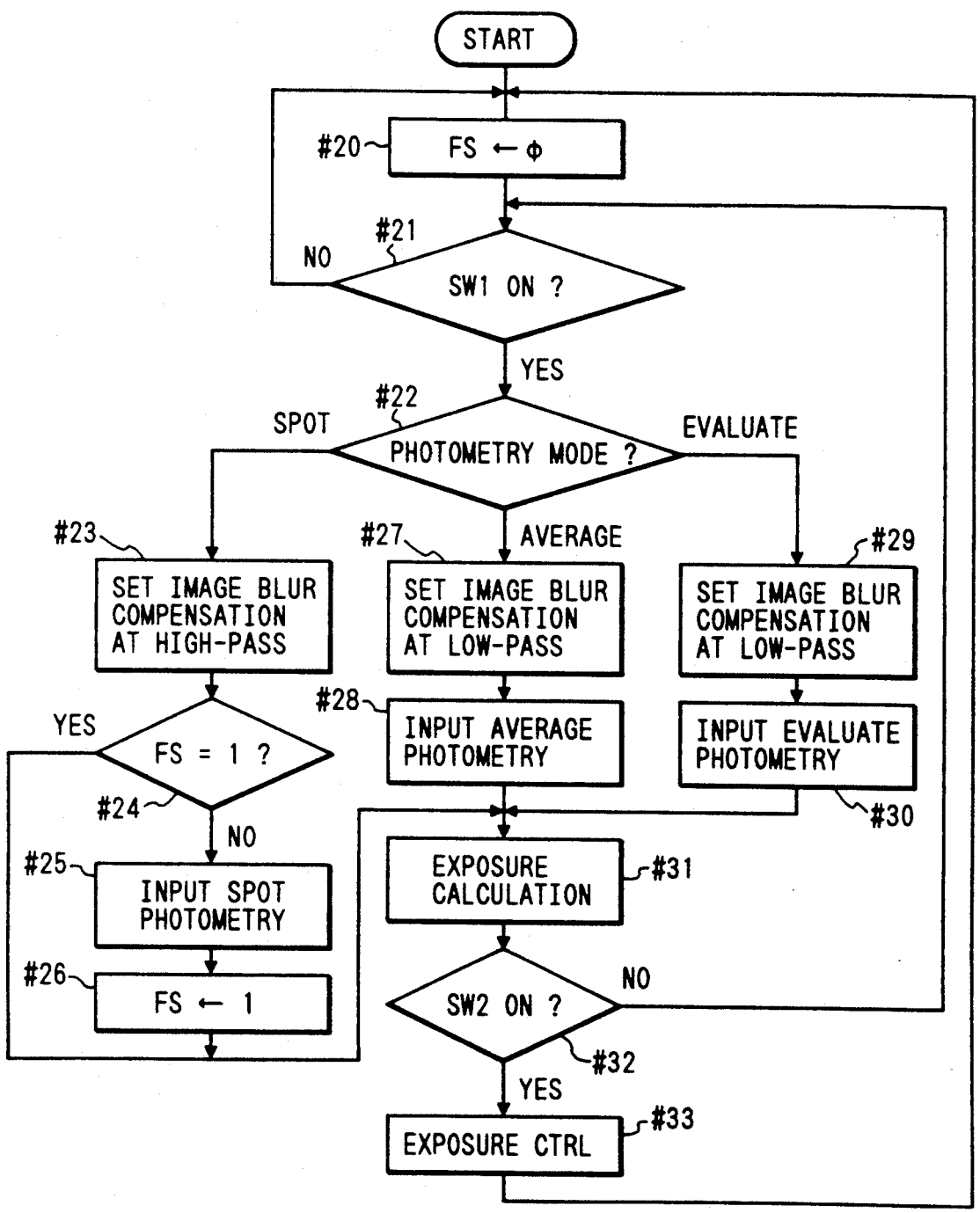
FIG. 6 is a flow chart showing an operation of the third embodiment of the present invention.

FIG. 6 is a flow chart showing an operation of the third embodiment of the present invention. This embodiment is based on an arrangement in which a spot photometry button (i.e., 202 in FIG. 1) is omitted. When the spot photometry mode is selected, a spot photometry value at a frame position corresponding depression of a switch SW1 is held. Other circuit arrangements of the third embodiment are the same as those of FIG. 1. In this arrangement, an image blur compensation range is changed in accordance with types of photometry modes. This will be described below with reference to FIG. 6.

In step #20, a spot photometry input flag FS is set to "0".

It is determined in step #21 whether the switch SW1 is ON. If YES in step #21, the flow advances to step #22. Otherwise, the flow returns to step #20.

A currently selected photometry mode is determined in step #22. If the spot photometry mode is selected, the flow advances to step #23. If the average photometry mode is selected, the flow advances to step #27. If the evaluate photometry mode is selected, the flow advances to step #29.

Since the spot photometry mode is set, an image blur compensation range is set to be a high-frequency operation range in step #23. The content of this step is the same as that in step #4 in FIG. 3.

In order to determine whether the spot photometry value is already input, the state of the flag FS is checked in step #24. As a result, if the spot photometry is performed, the flow advances to step #31. Otherwise, the flow advances to step #25.

In step #25, the spot photometry value is input. The flow then advances to step #26.

In step #26, the flag FS is set to "1".

As is apparent from the above description, once the flag FS is set to "1" in step #26 in the spot photometry mode, "FS=1" is determined in step #24 in the next cycle. The flow jumps the operations in steps #25 and #26, so that the first photometry value is held.

When it is determined in step #22 that the average photometry mode is selected, the flow advances to step #27.

In step #27, the image blur compensation range is set to a low-frequency range. The content of step #27 is the same as that of step #8 in FIG. 3.

The average photometry value is input in step #28, and the flow advances to step #31.

It is determined in step #22 that the evaluate photometry mode is already selected, the flow advances to step #29.

In step #29, the image blur compensation range is set to a low-frequency range as in the average photometry mode.

The evaluate photometry value is input in step #30, and the flow advances to step #31.

In step #31, an exposure calculation is performed on the basis of the photometry value information input in correspondence with each photometry mode.

It is determined in step #32 whether a switch SW2 is ON. If YES in step #32, the flow advances to step #33. Otherwise, the flow returns to step #21.

Exposure control is performed in step #33.

When the series of operations described above are completed, the flow returns to step #20 to reset the flag FS to "0". The state of the switch SW1 is determined in step #21 again.

According to each of the first and third embodiments described above, since the image blur compensation range is limited to only the high-frequency range in the spot photometry mode, compensation of a hand vibration such as a low-frequency component such as a change in framing is not performed, and hand vibration compensation is performed for only the high-frequency component. The device can quickly cope with framing desired by the photographer even immediately after spot photometry is performed. When the switch SW1 is depressed after the frame is determined, the image blur compensation range is widened to the low-frequency range, normal hand vibration compensation can be performed, resulting in convenience.

Almost the same effect as described above can be obtained as in the second embodiment wherein image blur compensation is stopped.

In the above embodiments, the expression of "spot photometry mode" is used. However, the mode can be any mode (e.g., a center photometry mode) for measuring a relatively small area within the frame.

The means for changing the image blur compensation operation range is arranged in a block for integrating angular velocities into an angular deviation in FIG. 2. The same frequency characteristics as this means may be provided in the integrator 8 for converting the angular acceleration into the angular velocity. In addition, the means for interrupting the image blur compensation operation is not limited to the arrangement shown in FIG. 4. Any other means such as a means for interrupting a signal loop or a means for inhibiting energization of a motor may be used.

In the ON state of the spot photometry button 202, spot photometry is performed and at the same time the photometry value is held. This is equal to the content of AE lock in a conventional camera. If the spot photometry button 202 is regarded as an AE lock button, the same processing can be performed for AE lock. This is also true in the second embodiment wherein the spot photometry value is held in the spot photometry mode while the switch SW1 is kept on.

According to each of the embodiments described above, the control means for controlling driving of the image blur compensating means in accordance with a photometry area selected by the photometry mode selecting means is arranged. For example, when part of the area within the spot photometry frame is selected as a photometry area, the image blur compensation operation range of the image blur compensating means is changed, or the image blur compensation operation is interrupted, i.e., the image blur compensation operation is controlled. Therefore, a change in framing can be performed without posing any problem.

It should be noted that each of the above embodiments can also be applied as a so-called prefocus operation for replacing spot photometry with distance measurement, measuring a distance to an object, and photographing the object after framing is changed.

Figure 7:
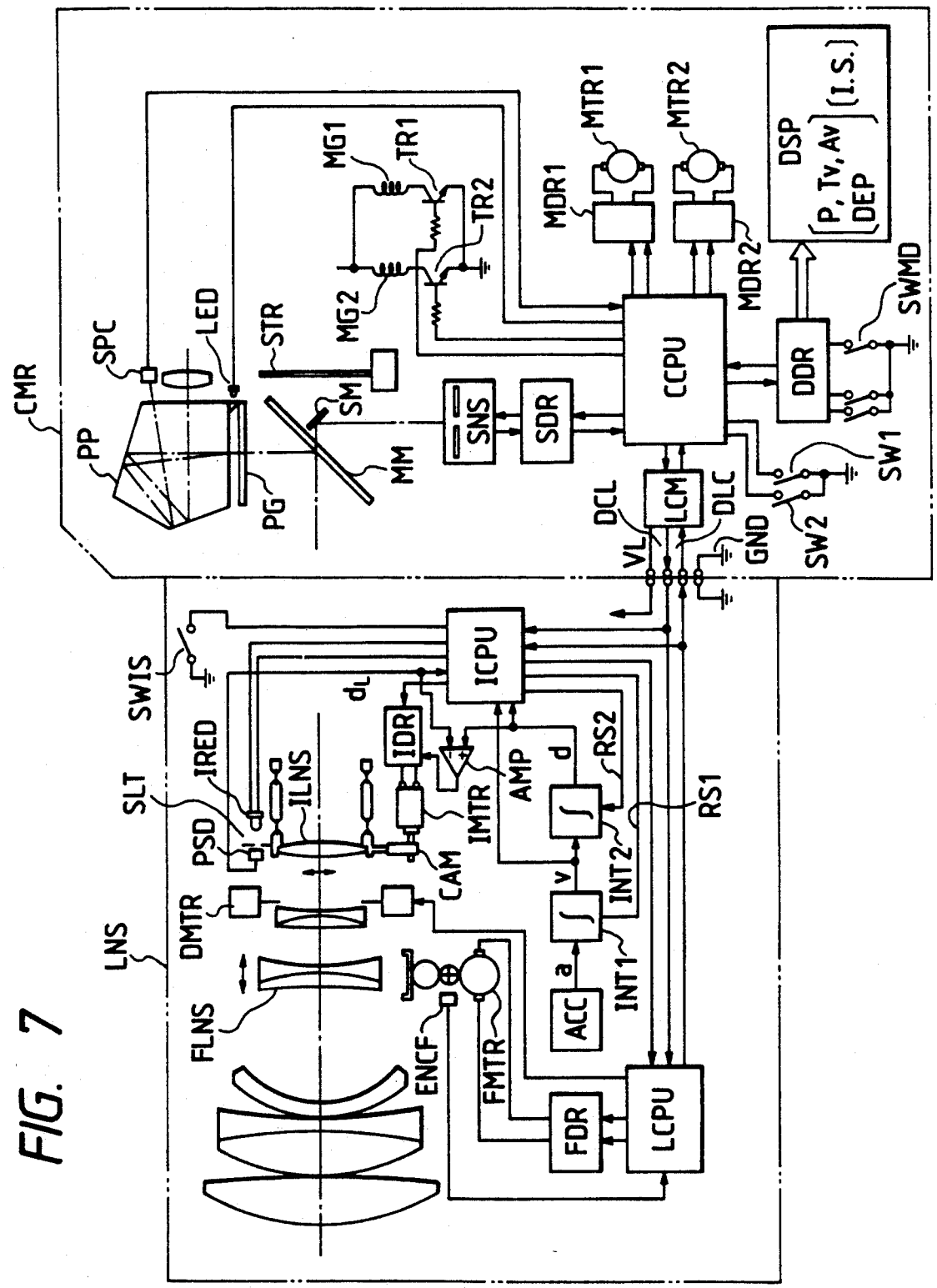
FIG. 7 is a block diagram showing an arrangement of the fourth embodiment of the present invention.

FIGS. 7 to 12 show the fourth embodiment of the present invention. FIG. 7 shows the main part of this embodiment.

Referring to FIG. 7, an arrangement comprises a camera body CMR and a detachable lens LNS.

An arrangement of the camera body CMR will be described below.

A camera microcomputer CCPU comprises a one-chip microcomputer having a ROM, a RAM, and an A/D conversion function. The camera microcomputer CCPU performs a series of camera operations such as automatic exposure control, automatic focus control, and film winding in accordance with camera sequence programs stored in the ROM. The camera microcomputer CCPU communicates with peripheral circuits in the camera body CMR and the lens to control operations of the respective internal circuits and the lens.

A lens communication buffer circuit LCM applies a voltage to the lens LNS through a power line VL and serves as an interlens communication buffer for outputting a signal from the camera body CMR to the lens LNS through a signal line DCL and a signal from the lens LNS to the camera body CMR through a signal line DLC.

A focus detection line sensor SNS (to be briefly referred to as a sensor SNS hereinafter) includes a CCD. A sensor driver circuit SDR drives the sensor SNS in accordance with a command from the camera microcomputer CCPU. The sensor driver circuit SDR receives an image signal from the sensor SNS, amplifies the image signal, and sends the amplified image signal to the camera microcomputer CCPU.

Light from the lens LNS is incident on a photometry sensor SPC through a main mirror MM, a focusing screen PG, and a pentagonal prism PP. An output from the photometry sensor SPC is input to the camera microcomputer CCPU and is used for autoexposure control (AE) in accordance with a predetermined program.

A switch detection/display circuit DDR switches a display content of a camera display member DSP on the basis of data sent from the camera microcomputer CCPU and signals an ON/OFF state of each operation member of the camera to the camera microcomputer CCPU by means of communication. Switches connected to the circuit DDR are various external operation switches of the camera body CMR. One of these switches serves as a switch SWMD for selecting and switching an exposure control mode such as a program AE mode, a shutter priority AE mode, an aperture priority AE mode, or a depth priority AE mode. The selected exposure control mode is displayed on the display member DSP.

A light-emitting diode LED indicates a focus detection state within the finder and is turned on in an in-focus state.

The switches SW1 and SW2 are interlocked with a release button (not shown). By the half stroke of the release button, the switch SW1 is turned on. By the full stroke of the release button, the switch SW2 is turned on. In response to the ON state of the switch SW1, the camera microcomputer CCPU generates start signals of photometry, an AF control operation, and an image blur compensation operation. In response to the ON state of the switch SW2, the camera microcomputer CCPU performs exposure control and film winding. Note that the switch SW2 is connected to an "interrupt input terminal" of the camera microcomputer CCPU. Even during execution of a program upon ON operation of the switch SW1, an interrupt signal is generated upon ON operation of the switch SW2. A predetermined interrupt program can immediately run.

A motor MTR1 serves as a film feed motor, and a motor MTR2 serves as a mirror up/down and shutter spring charge motor. The motors MTR1 and MTR2 are reversible motors which are controlled by driver circuits MDR1 and MDR2, respectively.

Magnets MG1 and MG2 start running the front and rear curtains of the shutter and are respectively energized by amplification transistors TR1 and TR2. Shutter control is performed by the camera microcomputer CCPU.

An arrangement of the lens LNS side will be described below.

A lens microcomputer LCPU comprises a one-chip microcomputer having a ROM, a RAM, and an A/D conversion function as in the camera microcomputer CCPU. The lens microcomputer LCPU controls driving of a focus control lens FLNS and driving of an aperture in accordance with a command sent from the camera microcomputer CCPU through the signal line DCL. The lens microcomputer LCPU sends various operating conditions of the lens (i.e., an amount of driving of a focus control optical system, and an aperture down count) and parameters (e.g., an open f-number, a focal length, and a coefficient representing a defocus amount vs. lens extension amount) to the camera side through the signal line DLC.

A motor FMTR drives the focus control lens FLNS turns a helicoid ring (not shown) through a gear train to axially move the lens FLNS to perform focus control.

A driver circuit FDR drives the motor FMTR and controls forward/reverse rotation and braking of the motor FMTR in accordance with a signal from the lens microcomputer LCPU.

This embodiment exemplifies an inner focus type arrangement. When a focus control command is sent from the camera microcomputer CCPU, the motor FMTR is driven in accordance with the drive amount and direction sent together with the focus control command, so that the focus control lens FLNS is axially moved to perform focus control. A movement amount of the focus control lens FLNS is monitored by pulses in an encoder circuit ENCF, and the pulses are counted by a counter in the lens microcomputer LCPU. When predetermined movement of the focus control lens FLNS is completed, the motor FMTR is controlled.

For this reason, once a focus control command is sent from the camera body CMR, the camera microcomputer CCPU is not associated with lens driving until lens driving is completed. The content of the counter can be sent to the camera body CMR as needed.

When an aperture control command is sent from the camera body CMR, a stepping motor DMTR known as an aperture driving motor is driven in accordance with an aperture down count sent together with the aperture control command.

An image blur compensation microcomputer ICPU controls an image blur compensation operation and receives a signal DCL sent from the camera body CMR to the lens LNS and a signal DLC sent from the lens LNS to the camera body CMR. An output signal from image blur compensation microcomputer ICPU is input to the lens microcomputer LCPU. That is, the camera microcomputer CCPU communicates with only the lens microcomputer LCPU. The image blur compensation microcomputer ICPU interfaces communication between the lens microcomputer LCPU and the camera microcomputer CCPU. Communication from the image blur compensation microcomputer ICPU to the camera microcomputer CCPU is performed through the lens microcomputer LCPU.

An acceleration detector (accurately an angular acceleration detector) ACC detects a blur of the lens and outputs an (angular) acceleration signal a to an integrator INT1. The integrator INT1 integrates the acceleration signal a and sends an (angular) velocity signal a to the image blur compensation microcomputer ICPU and an integrator INT2. The integrator INT2 integrates the (angular) velocity signal a and sends an (angular) deviation signal d to the image blur compensation microcomputer ICPU and the noninverting input terminal of an operational amplifier AMP. On the other hand, outputs from the integrators INT1 and INT2 can be reset to "0" as needed in response to reset signals RS1 and RS2 from the image blur compensation microcomputer ICPU.

A compensation optical system ILNS serves as an optical axis eccentric means and is supported by a link mechanism (to be described later). The compensation optical system ILNS can be moved in a direction almost parallel to a plane perpendicular to the optical axis.

An image blur compensation motor IMTR rotates a cam CAM fixed on the motor shaft in the forward/reverse direction to deviate the compensation optical system ILNS.

A driver circuit IDR for the image blur compensation motor IMTR drives the motor IMTR in the forward/reverse direction in accordance with an output signal from the operational amplifier AMP.

A position detection sensor PSD for the compensation optical system ILNS generates a position signal dL representing the incident light position, i.e., the position of the compensation optical system ILNS when light from an infrared light-emitting diode IRED passes through a slit SLT moved together with the compensation optical system ILNS and is incident on the light-receiving surface of the position detection sensor PSD.

This output signal (dL) is input to the image blur compensation microcomputer ICPU and the inverting input terminal of the operational amplifier AMP.

When a main switch SWIS for the image blur compensation operation circuit is turned on, the image blur compensation microcomputer ICPU and its peripheral circuits are powered. The integrators INT1 and INT2 are reset in response to the reset signals RS1 and RS2, respectively, and thus a blur signal is initialized. When the switch SW1 of the camera body CMR is turned on, this signal is supplied to the image blur compensation microcomputer ICPU through the lens microcomputer LCPU. The motor IMTR is driven to start an image blur compensation operation.

The signal dL is defined as the position signal of the compensation optical system ILNS, described above. Since the deviation of the compensation optical system ILNS is proportional to an optical eccentric amount caused by this deviation. In this sense, the signal dL can be regarded as a signal representing the optical eccentric amount. The origin of this signal is defined as a position where the axis of the compensation optical system ILNS coincides with the photographic optical axis.

FIG. 7 shows only a one-axis arrangement of the image blur compensation mechanism. However, since hand vibrations two-dimensionally occur, two-axial blurs must be detected in a practical lens, and the compensation optical system ILNS must also be two-dimensionally moved.

FIG. 8 is a perspective view showing a support mechanism of the compensation optical system ILNS in detail when viewed from the upper front side on the horizontal plane including the optical axis. Although blur detection and compensation are generally performed by decomposing a blur into components in a vertical direction (pitch) and a horizontal direction (yaw), this embodiment employs a blur compensation reference axis extending in the I and J directions inclined at 45° from the above two directions.

Referring to FIG. 8, an arrow G represents a gravitational direction. Angular acceleration detectors li and lj respectively detect angular blurs in the I and J directions of the photographic optical . axis C. The angular acceleration detectors li and lj correspond to the acceleration detector ACC in FIG. 7. An I-direction blur, i.e., an angular acceleration ai is detected by the angular acceleration detector li. A J-direction blur, i.e., an angular acceleration aj is detected by the angular acceleration detector lj. A stationary frame 31 is fixed on the photographic lens body. A movable frame 37 is coupled to the stationary frame 31 through plates 35 and 36 and flexible tongues 37 to 40 and is movable in a direction indicated by an arrow di. A holding frame 32 holds a compensation optical system 33 (corresponding to the system ILNS of FIG. 7) and is coupled to the movable frame 37 through plates 41 and 42 and flexible tongues 43 to 46. The holding frame 32 is movable in a direction of an arrow dj with respect to the movable frame 37.

A di-direction drive motor 51 corresponds to the motor IMTR in FIG. 7. The motor 51 is fixed on a flat portion 31i of the stationary frame 31 through a motor table 47. A cam 52 (corresponding to the cam CAM in FIG. 7) and a pulley 53 are fixed to an output shaft 51a of the motor 51. A cam surface 52a of the cam 52 is in contact with a cam follower 54 mounted on the movable frame 37. Upon rotation of the motor shaft 51a and the cam 52, the movable frame 37 is moved in the di direction. One end of a spring 56 is coupled to the distal end of a wire 55 wound around the pulley 53. The other end of the spring 56 is hooked around a spring hook 57 extending upright on the movable frame 37. A contact force F acts between the cam 52 and the cam follower 54. The pulley 53 and the wire 55 are used to generate this contact force because generation of a torque on the cam 52 is prevented by this contact force. Its detailed mechanism is proposed in previous applications filed by the present applicant, and a detailed description thereof will be omitted.

A slit plate 58 is fixed on the movable frame 37 and corresponds to the slit SLT in FIG. 7. A position of the movable frame 37 in the di direction is detected by an infrared light-emitting diode 59 (corresponding to the diode IRED in FIG. 7), a position sensor 60 (corresponding to the sensor PSD in FIG. 7), and a slit 58a of the slit plate 58 in accordance with a known method.

A motor 61 drives the lens holding frame 32 in the dj direction and is fixed to a flat portion 31j of the stationary frame 31 through a motor table 48. A cam 62 and a pulley 63 are fixed on a motor shaft 61a. The cam 62 is in contact with a cam follower 64 by a wire 65, a spring 66, and a spring hook 67. The cam follower 64 is not mounted on the lens holding frame 32 but on an intermediate lever 71. The intermediate lever 71 is coupled to the stationary frame 31 through a flexible tongue 72 and is pivotal in the direction indicated by an arrow $\theta j$. Intermediate bearings 73 and 74 are mounted on the lever 71, and the bearings are in contact with a flat portion 32j of the lens holding frame 32. Upon rotation of the cam 62, the cam follower 64, the intermediate lever 71, and the intermediate bearings 73 and 74 are deviated together in the $\theta j$ direction, thereby moving the lens holding frame 32 in the dj direction. The deviation of the movable frame 37 in the di direction is absorbed between the flat portion 32j of the lens holding frame 32 and the intermediate bearings 73 and 74, and interference between the movements in the di and dj directions can be prevented. A slit plate 68 is fixed on the lens holding frame 32 and cooperates with an infrared light-emitting diode 69 and a position sensor PSD 70 to detect a deviation of the lens holding frame 32 in the dj direction.

With the above arrangement, a blur of the lens in the I direction is detected by the angular acceleration detector li, and the motor 51 is driven on the basis of this blur signal to drive the stationary frame 37 and the lens holding frame 32 in the di direction. A blur in the J direction is detected by the angular acceleration detector lj to drive the motor 61, so that the lens holding frame 32 is driven in the dj direction through the intermediate lever 71. A two-dimensional blur compensation operation can be performed by the above two-axial blur compensation operation.

Operations of the camera body CMR and the lens LNS having the above arrangements will be described with reference to flow charts in FIGS. 7, 9, and 10.

When a power switch (not shown) on the camera body CMR side is turned on, power supply to the camera microcomputer CCPU is started, and the camera microcomputer CCPU starts execution of the sequence program stored in the ROM.

Figure 9B:
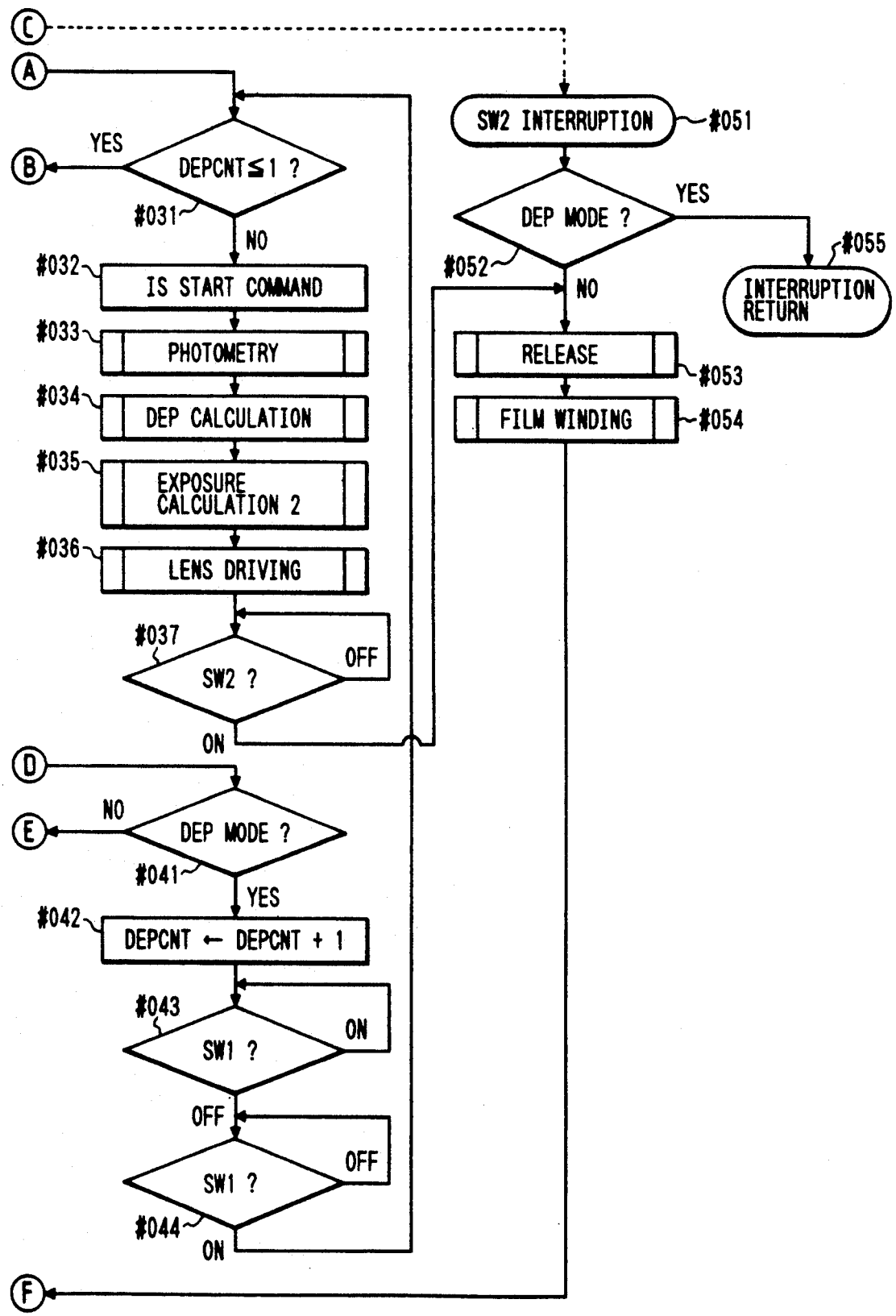
Figure 10:
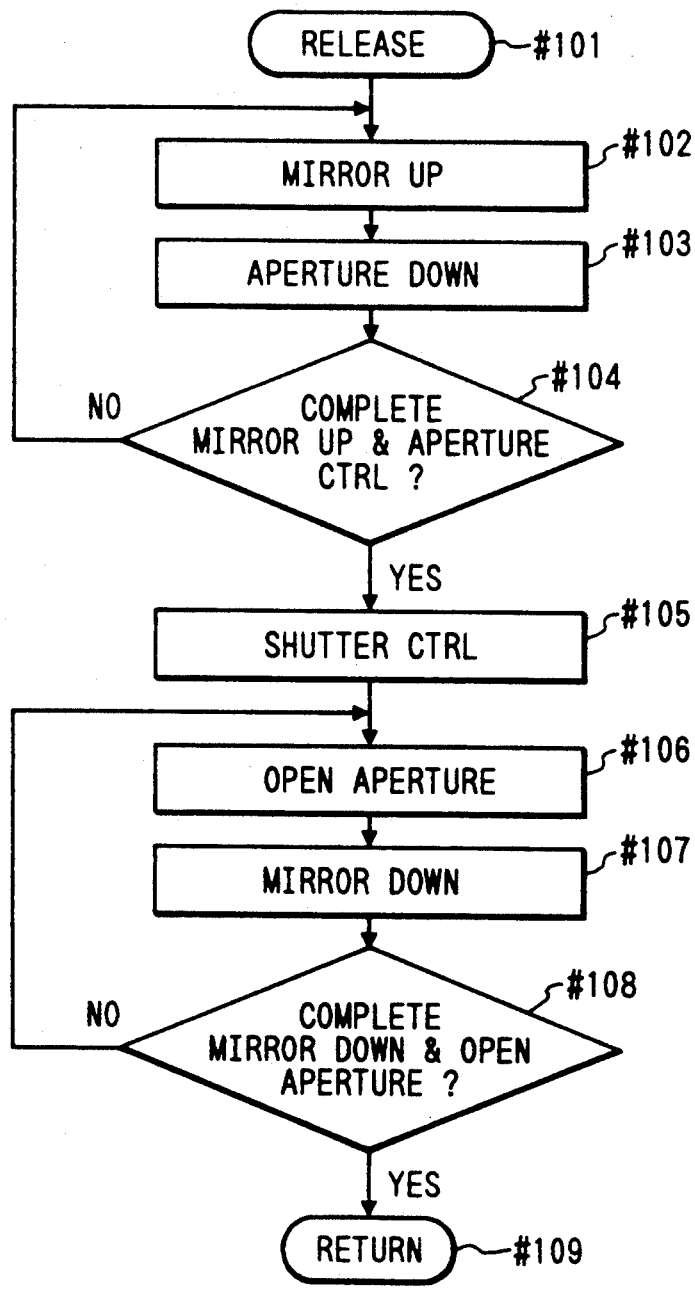

FIG. 9 is a flow chart showing a flow of a program on the camera body CMR side.

When the program execution is started by the above operations, the flow advances from step #001 to step #002. It is determined in step #002 whether the operating state of the switch SW1 turned on by the half stroke of the release button is detected. If the switch SW1 is OFF, the flow advances to step #003. Control flags and variables set in the RAM in the camera microcomputer CCPU are cleared and initialized.

In step #004, a counter DEPCNT for counting the number of in-focus operations in the depth priority AE mode and a counter PDEP representing a lens drive amount in the depth priority AE mode are cleared.

In step #005, an image blur compensation operation stop command is transmitted to the lens side.

Steps #002 to #005 are repeated until the switch SW1 is turned on or the power switch is turned off.

Upon turn-ON operation of the switch SW1, the flow advances from step #002 to step #011.

Lens communication 1 is performed in step #011. This communication is performed to obtain necessary pieces of information for exposure control (AE) and focus control (AF). When the camera microcomputer CCPU sends a communication command to the lens microcomputer LCPU through the signal line DCL, the lens microcomputer LCPU transmits through the signal line DLC information such as a focal length, an AF sensitivity, an open f-number, and the like stored in the ROM.

It is determined in step #012 whether the exposure mode is the depth priority AE mode. If NO in step #012, i.e., when the determined mode is an exposure mode such as a program AE mode or a shutter speed priority AE mode, the flow advances to step #013. However, when the determined mode is the depth priority AE mode, the flow advances to step #031. Operations from step #013 will be described below.

In step #013, an image blur compensation operation start command is transmitted to the lens LNS side.

In step #014, a "photometry" subroutine is executed to perform exposure control. More specifically, the camera microcomputer CCPU sends an output from the photometry sensor SPC in FIG. 7 to the analog input terminal. This output is converted into a digital photometry value Bv.

In step #015, "exposure calculation 1" subroutine for obtaining an exposure control value is performed. In this subroutine, a time value Tv and an aperture value Av are determined in accordance with the APEX calculation formula "Av + Tv = Bv + Sv" and a predetermined program diagram. The time value Tv and the aperture value Av are stored at predetermined addresses of the RAM.

In step #016, an "image signal input" subroutine is excited. In this subroutine, an image signal from the focus detection sensor SNS is input to the camera microcomputer CCPU.

In step #017, a defocus amount of the photographic lens is calculated on the basis of the input image signal.

The subroutines in steps #016 and #017 are disclosed in Japanese Patent Application No. 61-160824 filed by the present applicant, and a detailed description thereof will be omitted.

It is determined in step #018 whether a focal detection calculation result in step #017 represents an in-focus state. If NO in step #018, the flow advances to step #019.

In step #019, a "lens driving" subroutine is executed. In this subroutine, only the drive pulse count of the focus control lens FLNS which is calculated in step #017 on the camera body CMR side is transmitted to the lens microcomputer LCPU. Thereafter, the lens microcomputer LCPU drives and controls the motor FMTR in accordance with a predetermined acceleration/deceleration curve. Upon completion of driving, an end signal is sent to the camera microcomputer CCPU, and the subroutine is ended. The flow then advances to step #020. In step #020, since DEPCNT=0, then the flow returns to step #002.

If the in-focus state is determined in step #018, the flow advances to step #041. Step #041 describes an operation for a mode which is not the depth priority AE mode. The flow then returns from step #041 to step #002.

A flow in the depth priority AE mode will be described below.

It is determined in step #012 through steps #002 and #011 that the mode is the depth priority mode, the flow advances to step #031.

If the counter DEPCNT represents a count of "1" or less, i.e., if the in-focus count in the depth priority AE mode is one or less in step #031, the flow advances to step #016. An AF operation is performed in steps #016 and #017. If a defocus state is detected in step #018, the lens is driven in step #019, and the flow advances to step #020. The above operations are repeated until an in-focus state is obtained.

When the in-focus state is determined in step #018, the flow advances to step #041.

It is determined in step #041 whether the current AE mode is the depth priority AE mode. If YES is present, then the flow advances to step #042.

In step #042, the content of the counter DEPCNT is incremented by one. At present, DEPCNT=1 is obtained. This indicates that the in-focus operation has been completed for the first object in the depth priority AE mode.

In step #043, the state of the switch SW1 is detected. If the switch SW1 is OFF, i.e., if the half stroke of the release button is released, the flow advances to step #044. The flow stops at step #044 until the switch SW1 is kept off. During this period, a change in framing of the camera is generally performed so as to perform focus detection of the second object. In the flow described so far, since an IS start command is not generated, an image blur compensation operation is inhibited, and an operation error caused by a change in framing does not occur.

When the switch SW1 is turned on again in step #044, the flow advances to step #031, and the content . of the counter DEPCNT is determined. At this time, however, since DEEPCNT=1 is obtained, the flow transits to step #016 again. The AF operations in steps #016 to #019 are performed. The content of the counter DEPCNT is determined in step #020. At this time, DEPCNT=1 is obtained, and the flow advances to step #021. In step #021, a lens driving amount P (focusing plane conversion value) executed in step #019 is added. The above operations are repeated until an in-focus state is obtained.

When the in-focus state is determined in step #018, the flow advances to step #042 through step #041. In step #042, "1" is added to the counter DEPCNT so that DEPCNT=2 is obtained. That is, at this time, an in-focus operation for the second object has been completed.

In step #043, the state of the switch SW1 is detected. When the switch SW1 is turned off, the flow advances to step #044. During the OFF period of the switch SW1, the flow is stopped in step #044. During this period, a photographer changes framing for photography. When the change in framing is completed and the switch SW1 is turned on again, the flow returns to step #031.

The content of the counter DEPCNT is determined in step #031. At this time, since DEPCNT=2 is obtained, the flow transits to step #032.

In step #032, an image blur compensation start command is transmitted to the lens LNS. That is, image blur compensation is started in the depth priority AE mode for the first time.

The same "photometry" subroutine as in step #014 is performed in step #033.

In step #034, a focusing position and the aperture value for the depth priority AE mode are calculated. That is, the value counted in the in-focus flow at DEPCNT=1 is stored in the counter PDEP. This value represents the focusing position of the second object with respect to the first object. The photographic lens is set in an in-focus state for the second object at present. Therefore, when the focus control lens FLNS is driven as follows:

$$-\frac{1}{2} \cdot PDEP$$

the defocus amount of the first object becomes equal to that of the second object. If an allowable diameter of a circle of confusion is given as $\epsilon$, an aperture value (i.e., an f-number) must be determined as follows so as to set defocus values of the first and second objects:

$$f\text{-number} = \frac{\left|\frac{1}{2} \cdot PDEP\right|}{\epsilon}$$

As described above, the lens driving amount and the aperture value are calculated in step #034.

In step #035, substitutions of the photometry value measured in step #033 and the aperture value determined in step #034 into the APEX calculation formula yield a time value:

$$Tv = Bv + Sv - Av$$

In step #036, the lens is driven in accordance with the lens driving amount calculated in step #034, and the flow advances to step #037.

In step #037, an operation state of the release switch SW2 is determined. If the switch SW2 is kept off, the flow is stopped in step #037. When the switch SW2 is turned on, the flow advances to step #053 to perform the "release" subroutine. In step #054, "film winding" is performed to complete photography of one frame in the depth priority AE mode. The flow then returns to step #002.

A release interrupt operation upon turn-ON operation of the release switch SW2 during the respective operations in the focus control cycle in steps #016 to #019 surrounded by a broken line will be described below.

As described above, the switch SW2 is connected to the interrupt input terminal of the camera microcomputer CCPU. Even during execution of any step, when the switch SW2 is turned on, the flow immediately transits to step #051.

When the operations of steps surrounded by the broken line are being performed and then a switch SW2 . interrupt signal is generated, it is determined in step #052 whether the current AE mode is the depth priority AE mode. If NO in step #052, the AF operation is interrupted, and the flow transits to the release operation from step #053. On the other hand, when the current AE mode is determined as the depth priority mode, the flow transits from step #052 to step #055 and returns from the interrupt subroutine to the main routine, thereby continuously performing the AF operation.

In the depth priority AE mode, the release operation cannot be performed by the switch SW2 interrupt during the operations of steps #016 to #019. In this case, a release operation is started from only step #137.

The above flow is briefly summarized as follows. When the photographic mode is not the depth priority mode, the image blur compensation operation is started together with the ON operation of the switch SW1, and at the same time the photometry and exposure calculations and the AF operation are performed. When an interrupt is generated upon ON operation of the switch SW2, the release operation is immediately started.

On the other hand, in the depth priority AE mode, the in-focus operation of the first object is performed for the first ON operation of the switch SW1. The in-focus operation of the second object is performed by the second ON operation of the switch SW1. Image blur compensation is started by the third ON operation of the switch SW1, and then photometry is performed. The focusing position control in the depth priority AE mode is performed, and the aperture value and the time value are calculated in this mode. In response to an ON signal from the second switch SW2, the release operation is performed.

The "release" subroutine will be described with reference to FIG. 10.

In step #102 after step #101, the main mirror MM is pivoted upward. This can be performed by controlling the motor MTR2 through the driver circuit MDR2 in FIG. 1.

Figure 3:
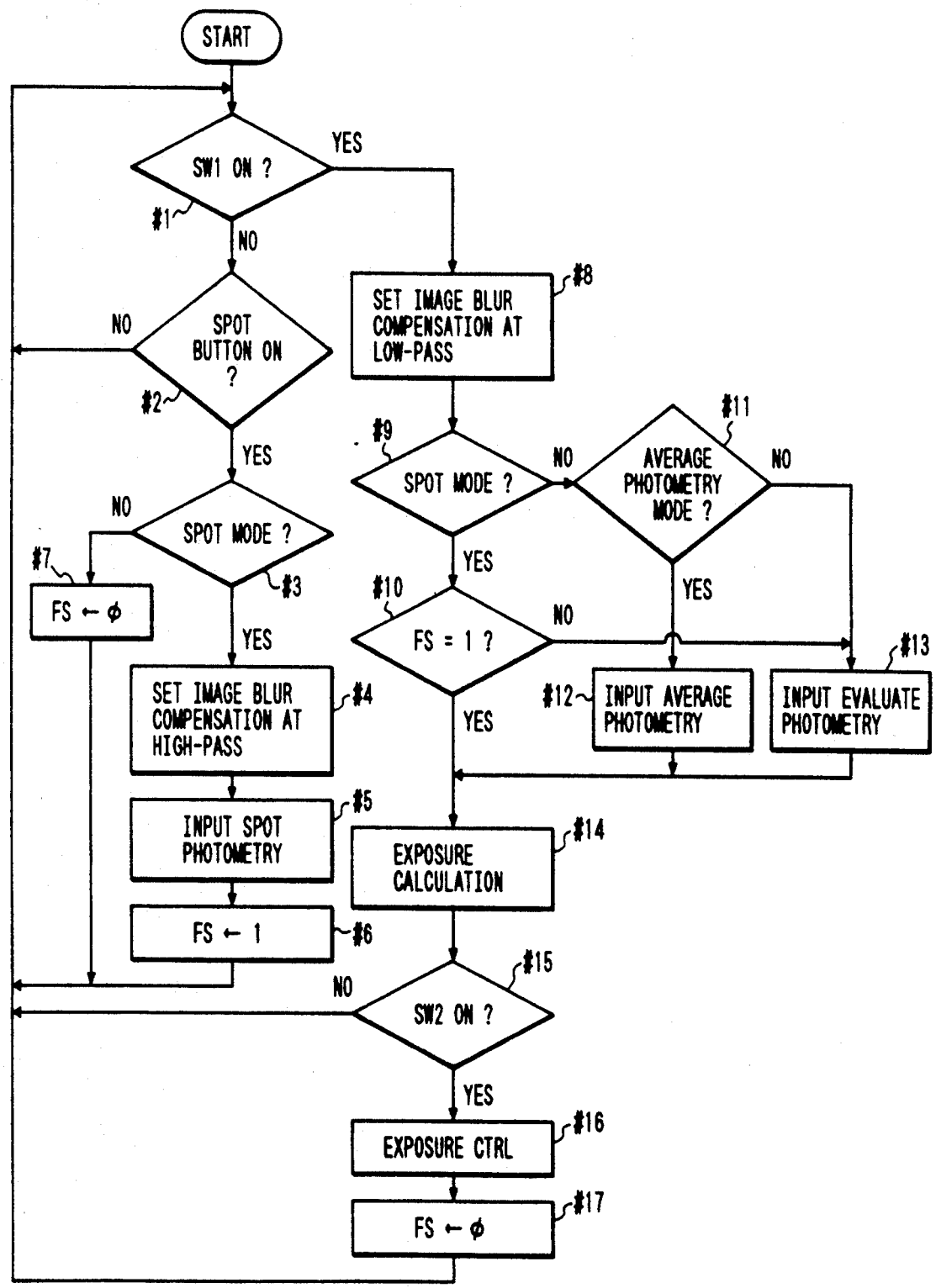
FIG. 3 is a flow chart showing an operation of the first embodiment of the present invention.

In step #103, the aperture value already stored in the "exposure calculation 1 or exposure calculation 2" in step #015 or #035 in FIG. 3 is sent to the lens LNS side, and the lens LNS side performs aperture control.

It is determined in step #104 whether the mirror up operation and the aperture down control in steps #102 and #103 are completed. The mirror up state can be detected by a detection switch (not shown) included in the main mirror MM. The aperture down control can be confirmed by whether the lens is driven by a predetermined aperture value. When either the mirror . up operation or the aperture down control is not completed, the flow is stopped in step #104, and the states are continuously detected. When the mirror up state and the aperture down state are confirmed, the flow advances to step #105. At this time, exposure conditions are prepared. In step #105, shutter control is performed by a shutter control value already stored in the "exposure calculation 1 or exposure calculation 2" in step #013 or #035 and the film is exposed.

When shutter control is completed, a command is sent to the lens LNS in step #106 so as to set the aperture in an open state. In step #107, a mirror down operation is performed. This mirror down operation is performed by controlling the motor MTR2 through the driver circuit MDR2 as in the mirror up operation.

Completion of the mirror down operation and the open aperture control operation is awaited in step #108 as in step #104. When the mirror down operation and the open aperture control operation are completed, the flow advances to step #109, and the subroutine returns to the main flow.

Figure 11:
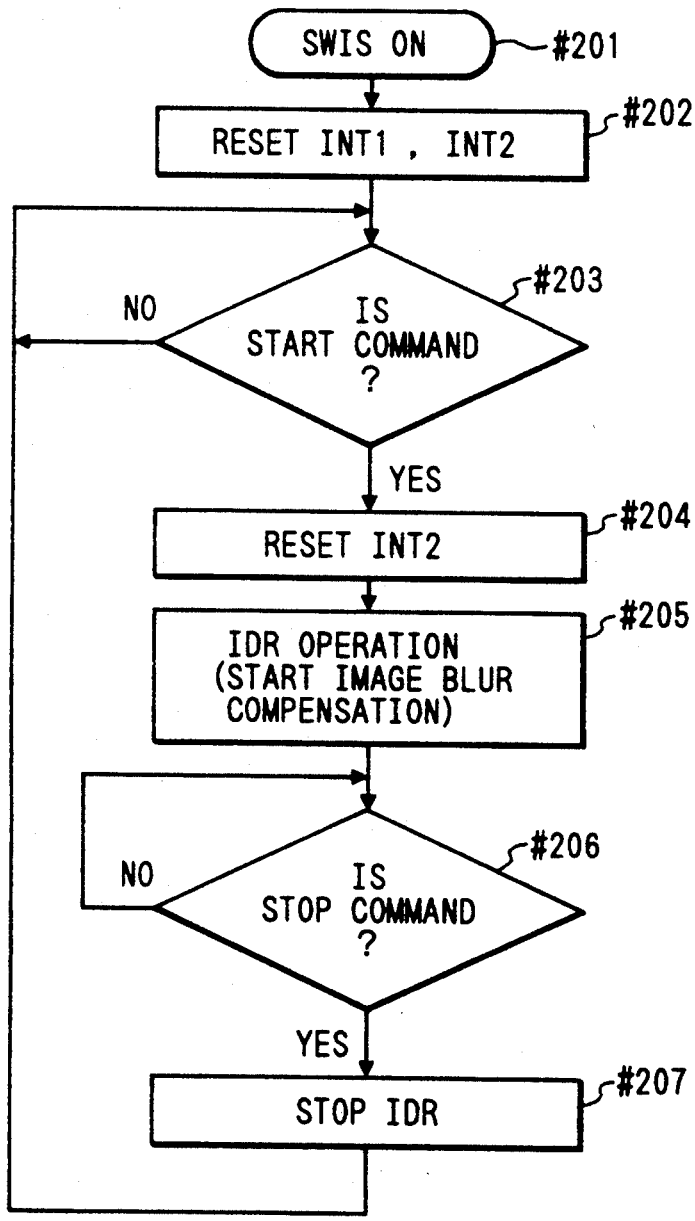

FIG. 11 shows a control flow of an image blur compensation operation.

In step #201, the image blur compensation main switch SWIS is turned on to power the image blur compensation microcomputer ICPU and its peripheral circuits.

In step #202, the two integrators INT1 and INT2 are reset, and their outputs v and d are initialized to "0".

In step #203, reception/nonreception the IS start command is determined. If the IS start command is not received from the camera, the flow is stopped in step #203. In this state, image blur compensation is not started. However, the acceleration detector ACC and the two integrators INT1 and INT2 are already operated, and their outputs a, v, and d are kept output.

When the IS start command is sent from the camera, the flow advances from step #203 to step #204. In step #204, only the integrator INT2 is reset due to the following reason. When image blur compensation is started in the next step, the compensation optical system ILNS starts its operation from the origin (i.e., the center of the movable range, i.e., the position where the axis of the system ILNS coincides with the optical axis C in FIG. 7) so as to effectively use the stroke.

In step #205, the driver circuit IDR for the motor IMTR is operated. When this circuit is enabled, it receives a signal from the operational amplifier AMP. The motor IMTR is driven and controlled in response to the signal from the operational amplifier AMP. During the initial period of this operation, the deviation signal d input to the noninverting input terminal of the operational amplifier AMP is set to "0" due to initialization. The amplifier AMP, the driver circuit IDR, and the motor IMTR are driven and controlled so that an output from the sensor PSD becomes "0", i.e., the compensation optical system ILNS comes to the origin (central position). This operation is called a centering operation. Thereafter, a deviation signal d generated by a blur is output from the integrator INT2, so that the deviation dL of the compensation optical system ILNS is controlled to satisfy the following condition:

$$dL = d$$

Therefore, an image is apparently stopped on the focusing plane, i.e., the focusing screen PG.

In the next step #206, the IS stop command is detected by communication. If any IS stop command is not transmitted, the flow is stopped in step #206, and the image blur compensation operation is continued. When the IS stop command is received, image blur compensation is interrupted, and the flow returns to step #203.

An operation of the lens microcomputer LCPU will be described with reference to FIG. 12.

When the power switch on the camera body CMR side is turned on, power is supplied from the camera body MCR to the lens LNS through mount contacts between the lens and the camera body. The lens microcomputer LCPU starts execution of a predetermined sequence program.

In step #302, while an SW1 ON signal is not sent from the camera body CMR, all control flags and variables set in the RAM in the lens microcomputer LCPU are cleared in step #303 to perform initialization.

When the SW1 ON signal is sent from the camera body CMR, the flow advances to step #304, and "communication 1" is performed. This operation corresponds to the "lens communication 1" in step #011 in FIG. 3. Various pieces of information stored in the ROM in the lens microcomputer LCPU are sent to the camera microcomputer CCPU.

When the camera microcomputer CCPU performs focus detection calculations and transmits a lens drive command, this is received in step #305. In the next step #306, the focus control lens FLNS is driven and controlled.

When lens driving is completed, an output of completion of drive is transmitted to the camera microcomputer CCPU in step #307, and the flow returns to step #302.

When an SW2 ON signal, i.e., a release start enable signal is sent from the camera body CMR during execution in step #306, an interrupt is allowed and the flow advances to step #312 through step #311.

In step #312, an aperture down command is received, and the aperture stepping motor DMTR is driven in step #313 to perform an aperture down operation.

In step #314, driving of the focus control lens FLNS is inhibited.

In step #315, completion of the aperture down operation is confirmed, and this is transmitted to the camera microcomputer CCPU. Upon reception of this signal, the camera microcomputer CCPU performs shutter control and film exposure.

When an open aperture command is received from the camera microcomputer CCPU in step #316, an open aperture operation is performed in the next step #317.

When the open aperture operation is completed, the completion signal is sent to the camera microcomputer CCPU in step #318, and the flow returns to step #302.

In the fourth embodiment described above, the depth priority AE operation is performed by a plurality of switching operations using the focus detection sensor SNS having one sensor array. However, the following fifth embodiment exemplifies an operation using a sensor SNS having a plurality of sensor arrays.

Figure 13:
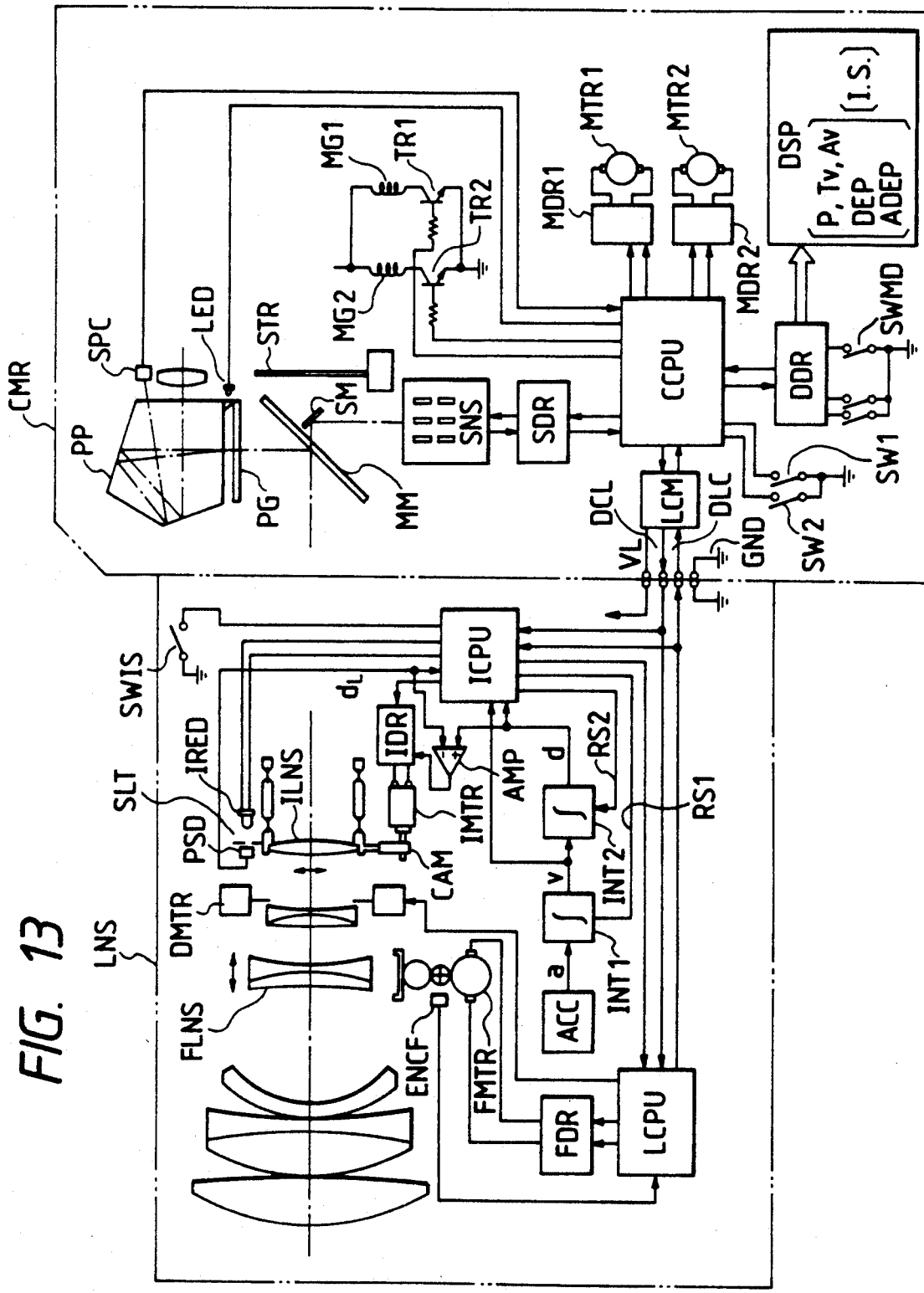
FIG. 13 is a block diagram showing the fifth embodiment of the present invention.

FIG. 13 is a diagram showing the fifth embodiment. A sensor SNS has three sensor arrays, so that focus detection of a plurality of areas can be performed. In addition to the program shutter priority AE mode, the aperture priority AE mode, and the depth priority AE mode, an automatic depth priority AE mode (ADEP display on a display DSP) can be selected.

Figure 14B:
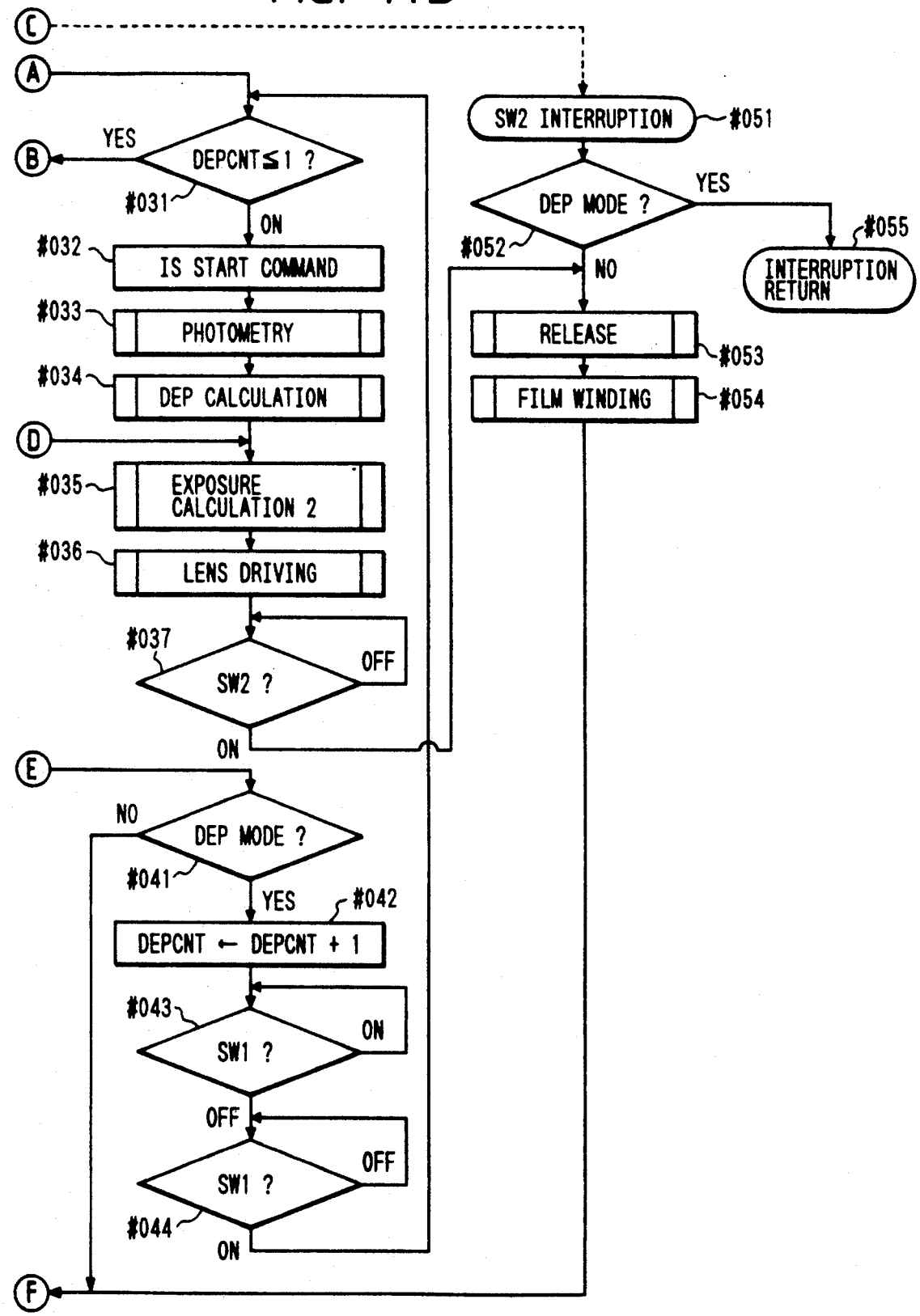

FIG. 14 is a flow chart showing an operation of the main part of the fifth embodiment. As compared with the flow chart (fourth embodiment) in FIG. 3, step #061 is added between steps #014 and #015. In addition, step #062 is added. Only differences will be described below.

When the automatic depth priority AE mode is selected, upon turn-ON operation of the switch SW1, the flow reaches step #013 through steps #011 and #012. An image blur compensation start command is transmitted to a lens LNS to start image blur compensation. After photometry is performed in step #014, it is determined in step #061 whether the current AE mode is the automatic depth priority AE mode. If YES in step #061, the flow advances to step #062.

In step #062, calculations of the automatic depth priority AE mode are performed as follows:
(1) Three areas of the photographic field of view are sequentially focus-detected by the three sensor arrays;
(2) The farthest and nearest objects are extracted; and
(3) A focusing position and an aperture value are determined so that the farthest object falls within the focal depth.

This calculation scheme is described in Japanese Laid-Open Patent Application No. 2-16554 to the present applicant, and a detailed description thereof will be omitted.

When the operation in step #062 is completed, the flow advances to step #035. The time value is determined on the basis of the aperture value determined in step #062. In step #036, the lens is driven in accordance with the focusing position calculated in step #062. When a release switch SW2 is turned on in step #037, the "release" subroutine in step #053 is performed. Film winding is performed in step #045, thereby completing photography of one frame.

The above flow is briefly summarized. When the automatic depth priority AE mode is selected, image blur compensation is started in response to the SW1 ON signal. Photometry and focus detection of a plurality of areas, and depth priority AE calculations are performed. The lens is then driven to a position where all the plurality of objects fall within the focal depth. Exposure control is performed with the aperture and time values calculated by predetermined calculations on the basis of the above results.

As described above, in the automatic depth priority AE mode, a change in framing need not be performed after the focal detection is performed. It is preferable to start image blur compensation at the first SW1 ON timing because an image blur compensation effect can be quickly confirmed. This embodiment also has the depth priority AE mode described with reference to the fourth embodiment, and either mode can be selectively set.

In each of the embodiments described with reference to FIGS. 7 to 14, in a camera wherein a plurality of objects at different distances are subjected to focus detection, and all the plurality of objects are set to fall within the focal depth, thereby achieving the so-called depth priority AE mode, and wherein upon the start of the focus detection operation, the start of the release preparation operation and the start of the image blur compensation operation are performed by a single operation member, the image blur compensation operation is not started with an operation of the operation member, but the image blur compensation operation is started with an operation member for starting the release preparation operation. More specifically, since the ON operation of the switch SW1 for starting focus detection operations of the first and second objects accompanies a change in framing, the image blur compensation operation is inhibited. Thereafter, when the switch SW1 is turned on to start photography upon completion of the change in framing, the image blur compensation operation is started. Therefore, high-speed focus detection can be performed without interfering with a change in framing upon detection of the focus detection operation. During the photographic operation, image blur compensation is performed to obtain a photograph without any blur.

Figure 15:
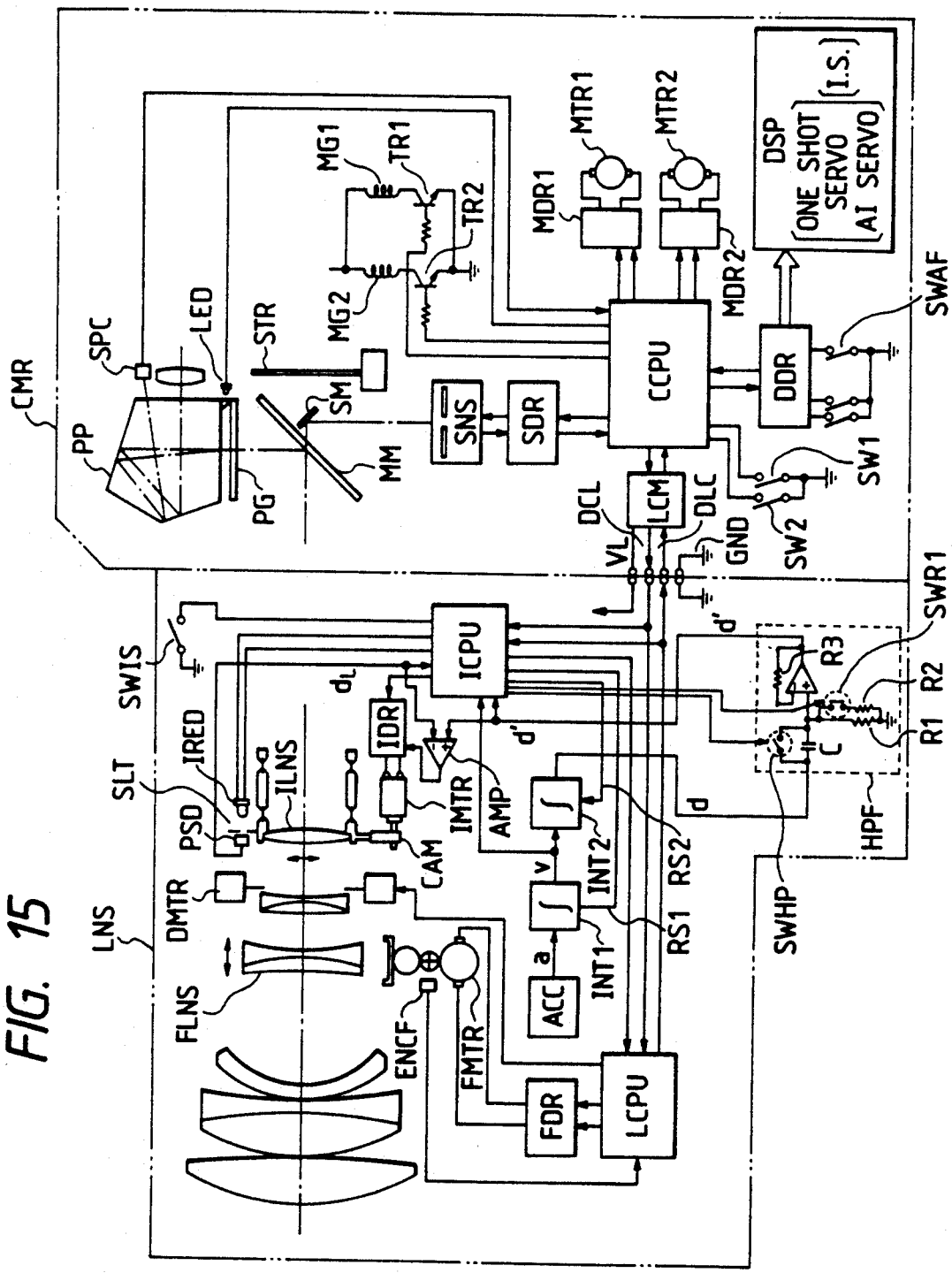
FIG. 15 is a block diagram showing the sixth embodiment of the present invention.

FIGS. 15 to 19 show the sixth embodiment. FIG. 15 shows the main part according to the present invention.

The same reference numerals as in FIG. 7 denote the same parts in FIG. 15 except for the parts to be describe later, and a detailed description thereof will be omitted.

A switch detection and display circuit DDR switches a display on a camera display member DSP and signals an ON/OFF state of each operation member of the camera to a camera microcomputer CCPU by means of communication on the basis of data sent from the camera microcomputer CCPU.

Switches connected to the circuit DDR are external operation switches of the camera. One of the switches is a switch SWAF for selecting and switching an AF mode such as a one-shot AF (single AF) mode or a servo AF (continuous AF) mode. The selected AF mode is displayed on the display member DSP.

A known high-pass filter HPF is connected to the output of an integrator INT2. The high-pass filter HPF comprises a switching means SWHP for discharging a capacitor C and an ON/OFF switch SWR1 for turning on/off a resistor R2.

The switch SWHP is a reset switch for the high-pass filter HPF. When the switch SWHP is turned on to discharge the capacitor C, the high-pass filter HPF is reset.

The switch SWR1 is a cutoff frequency switch for the high-pass filter HPF. The cutoff frequency of the high-pass filter HPF is given as follows:

$$f = \frac{1}{2\pi RC} \text{ [Hz]}$$

where R is a composite resistance value of a resistor R1 and the resistor R2. The switch SWR comprises a normally open switch. At this time, a cutoff frequency f1 is given as follows:

$$f1 = \frac{1}{2\pi R_1 C}$$

However, when the switch SWR is turned on, the following conditions are established:

$$R = \frac{R_1 R_2}{R_1 + R_2} < R_1$$

The cutoff frequency f2 is higher than the cutoff frequency f1. The switches SWHP and SWR1 are operated in accordance with a flow to be described later. An output d from the integrator INT2 is processed in accordance with a predetermined sequence and is output as a signal d'. This signal d, is input to an image blur compensation microcomputer ICPU and an operational amplifier AMP. A deviation in a given angular direction will be described with reference to FIGS. 16A to 16C when a camera is held at a given position. Time is plotted along the abscissa of each waveform chart in FIGS. 16A to 16C. The "deviation of blur" represents a deviation of the camera as a photographic device constituted by a camera body CMR and a lens LNS. This indicates a camera position (orientation) with respect to external coordinates, so that this deviation is not directly detected.

A first integrator INT1 in FIG. 15 outputs a velocity signal v. The deviation signal d' is output from the high-pass filter HPF. The actually detected deviation signal is the deviation signal d'.

The "deviation of blur", the "v", and the "d'" are conceptually illustrated for each AF mode, i.e., the one-shot AF mode, the servo AF mode, or the moving object anticipation servo AF mode.

Deviations in these AF modes and a processing method of this embodiment will be described in order below.

First, the one-shot AF mode will be described.

Figure 16A:
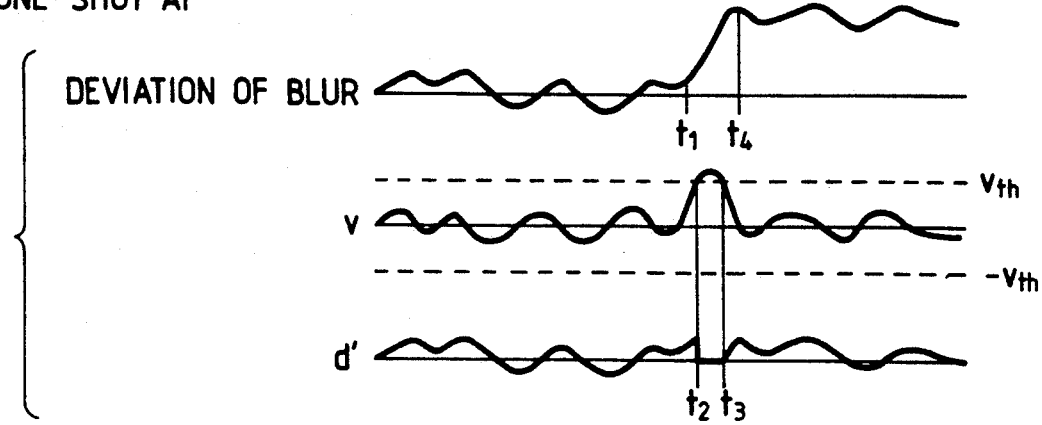
FIGS. 16A, 16B and 16C are waveform charts for explaining blur compensation in the respective AF modes.

The one-shot AF mode is often selected to photograph a stationary object as in a portrait or memorial photograph. Panning is not usually performed. However, when an AF operation is completed, a change in framing may be performed. FIG. 16A shows this state. Only a hand vibration occurs until time $t_1$, and a change in framing is started from time $t_1$ and is ended at time $t_4$. The corresponding velocity signal is the signal v in FIG. 16A. When blur compensation is performed throughout the entire time region, a change in framing by the photographer from time $t_1$ to time $t_4$ is canceled by the image blur compensation operation. The change in framing is not effected on the finder frame, resulting in inconvenience. In this embodiment, based on the fact that the velocity signal v becomes considerably large upon a change in framing, when the velocity v exceeds a limit value $\pm v_{th}$, the deviation d' is reset to "0". That is, when the velocity v exceeds the limit value $v_{th}$ at time $t_2$, the system determines that a change in framing occurs, and the deviation d' is reset to "0" until the velocity v becomes below $v_{th}$. When condition $|v| < v_{th}$ is established at time $t_3$, the output of the deviation d' is started. Therefore, the movement of a compensation optical system ILNS is defined by the deviation d'. During a change in framing, image blur compensation is inhibited, so that a change in framing can be performed. During other periods, image blur compensation is performed.

The servo AF mode will be described below.

Figure 16B:
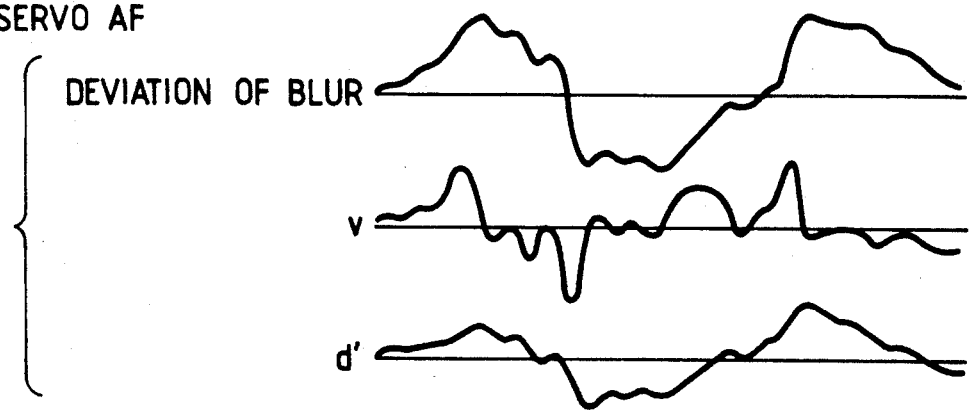

The servo AF mode is selected to photograph an object whose focusing state is always changing. Movements of the object in the vertical and horizontal directions are also irregular. A deviation of blur of the camera is represented by a waveform obtained by superposing a hand vibration on a low-frequency large-amplitude blur caused by a frequent change in framing, as shown in FIG. 16B. In this case, the cutoff frequency of the high-pass filter HPF is increased to weaken the effect of image blur compensation for a low-frequency blur caused by a change in framing. The compensation optical system ILNS is not much sensitive to the low-frequency large-amplitude blur, as indicated by the deviation signal d' in FIG. 16B. At the same time, a high-frequency blur caused by the hand vibration can be compensated. Therefore, a change in framing can be easily performed without degrading the hand vibration compensation capacity.

The moving object anticipation servo AF mode will be described below.

Figure 16C:
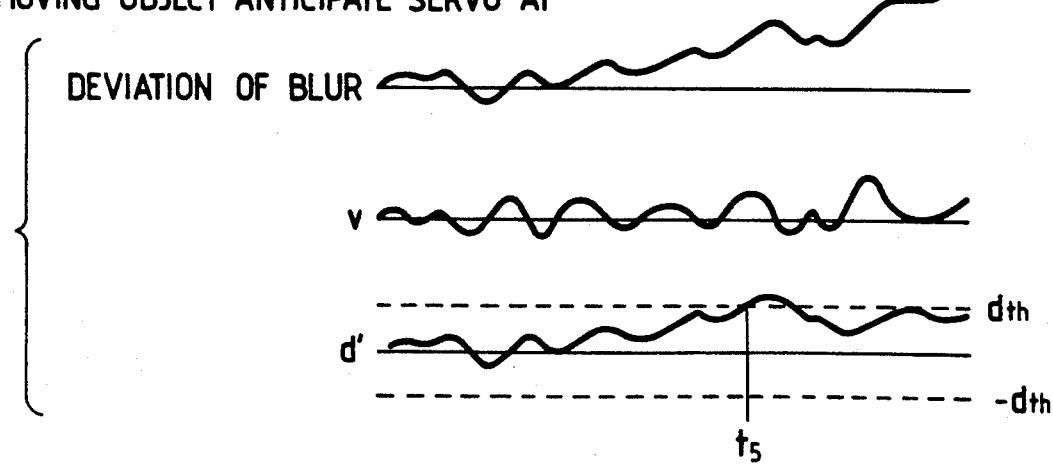

The moving object anticipation servo AF mode is selected to often photograph an object which is continuous moving away or continuously coming close to the camera. Panning is usually performed. The deviation of blur is gradually changed in one direction, as shown in FIG. 16C, and a hand vibration is superposed on this gradually changing deviation. At this time, the detected velocity is given as v in FIG. 16C, and a deviation signal d' having passed through the high-pass filter is shown in FIG. 16C. When a panning amount is small, a normal image blur compensation operation can be performed. However, when a panning amount is increased, the compensation optical system ILNS uses all the effective stroke (i.e., the system abuts against the inner wall of the lens barrel), and further image blur compensation cannot be performed. In this embodiment, when the deviation signal d' exceeds a limit value $d_{th}$ at time $t_5$, the cutoff frequency of the high-pass filter HPF is increased to prevent an increase in deviation d' by panning. By this processing, the system does not respond to the panning operation without degrading the hand vibration compensation capacity. Therefore, a panning operation in the moving object anticipation servo AF mode will not be interfered.

Operations of the camera body CMR and the lens LNS having the above arrangements will be described with FIG. 17.

When a power switch (not shown) on the camera body CMR side is turned on, the camera microcomputer CCPU is powered, and execution of a sequence program stored in the ROM in the camera microcomputer CCPU is started.

Figure 17B:
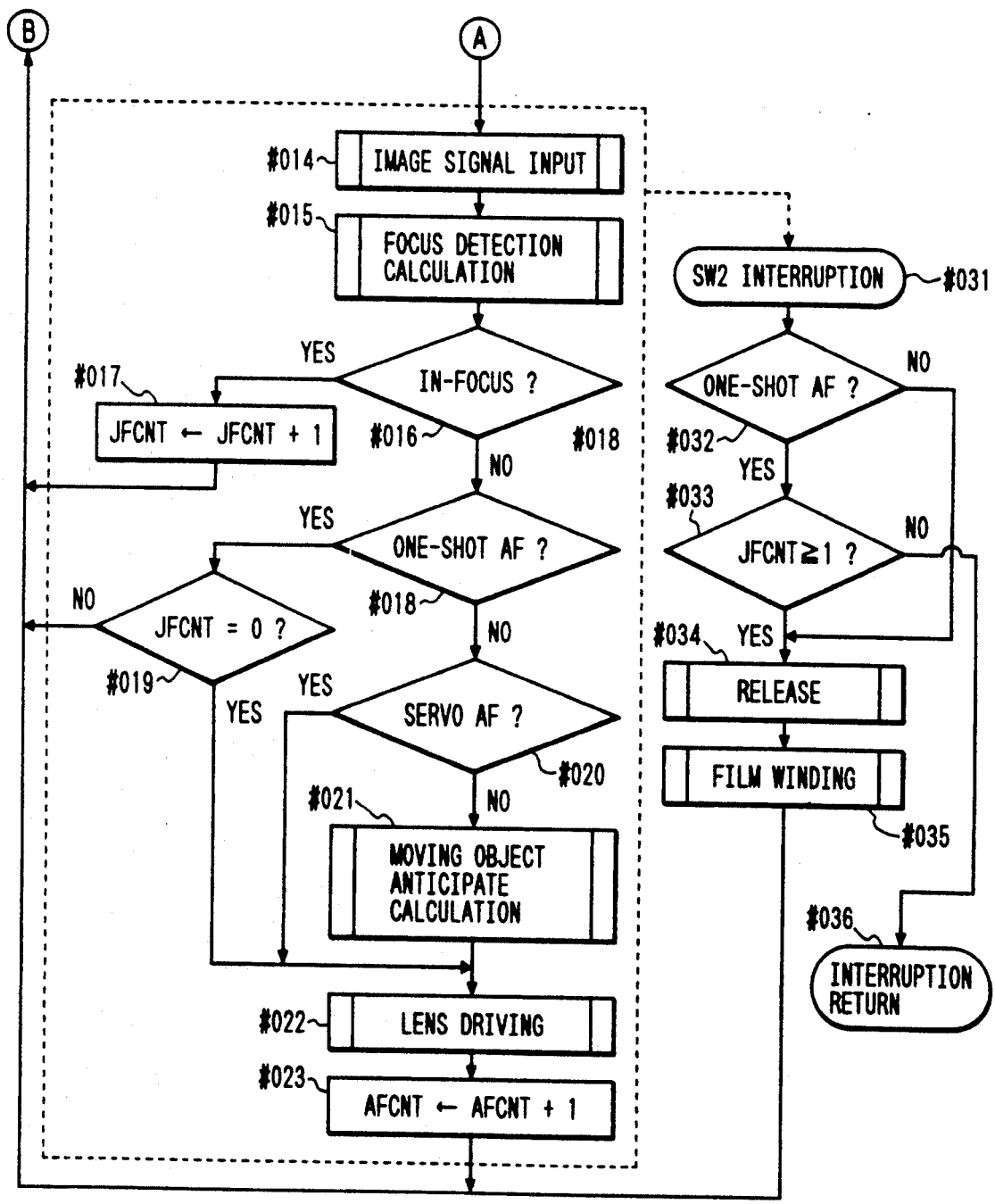

FIG. 17 is a flow chart showing a program on the camera body CMR side.

When the execution of the program is started by the above operation, the flow advances from step #001 to step #002 to detect a state of a switch SW1 turned on by a half stroke of the release button. When the switch SW1 is kept off, the flow advances to step #003 to clear and initialize all the control flags and variables set in the RAM in the camera microcomputer CCPU. In step #004, a counter JFCNT for counting the number of in-focus operations and a counter AFCNT for counting the number of AF operations are cleared. In step #005, a command for stopping an image blur compensation operation (IS) is transmitted to the lens LNS.

Steps #002 to #005 are repeated until the switch SW1 is turned on or the power switch is turned off.

When the switch SW1 is turned on, the flow a advances from step #002 to step #010.

In step #010, lens communication 1 is performed. This communication is performed to obtain necessary information for exposure control (AE) and focus control (AF). When a communication command is sent from the camera microcomputer CCPU to a lens microcomputer LCPU through a signal line DCL, the lens microcomputer LCPU transmits through a signal line DLC focal length information, AF sensitivity information, open f-number information, and the like stored in the ROM.

In step #011, a command for starting an image blur compensation operation is transmitted.

In step #012, a "photometry" subroutine for exposure control is executed. More specifically, the camera microcomputer CCPU sends an output from a photometry sensor SPC in FIG. 15 to the analog input terminal. This output is converted into a digital photometry value Bv.

In step #013, an "exposure calculation" subroutine for obtaining an exposure control value is performed. In this subroutine, a time value Tv and an aperture value Av are determined in accordance with the APEX calculation formula "Av +Tv=Bv +Sv" and a predetermined program diagram. The time value Tv and the aperture value Av are stored at predetermined addresses of the RAM.

In step #014, an "image signal input" subroutine is executed. In this subroutine, an image signal from a focus detection sensor SNS is input to the camera microcomputer CCPU.

In step #015, a defocus amount of the photographic lens is calculated on the basis of the input image signal.

The subroutines in steps #014 and #015 are disclosed in Japanese Patent Application No. 61-160824 filed by the present applicant, and a detailed description thereof will be omitted.

In step #016, in-focus determination is performed. If an in-focus state is set, the in-focus counter JFCNT is incremented by one in step #017, and the flow returns to step #002. Otherwise, the flow advances to step #018.

It is determined in step #018 whether the current AF mode is the one-shot AF mode. If YES in step #018, the flow advances to step #019.

The count of the in-focus counter JFCNT is determined in step #019. If JFCNT=0, i.e., if any in-focus state has not been detected yet, the flow advances to step #022 to drive the lens. However, if JFCNT≧1, then the flow returns to step #002.

When it is determined in step #018 that the current AF mode is not the one-shot AF mode, the flow advances to step #020 to determine whether the current AF mode is the servo AF mode. If YES in step #020, the flow advances to step #022 to drive the lens.

When it is determined in step #020 that the current AF mode is not the servo AF mode, i.e., that the current AF mode is the moving object anticipation AF mode, a moving object anticipation calculation is performed in step #021 to calculate a lens drive amount. Since the moving object anticipation calculation is disclosed in Japanese Laid-Open Patent Application No. 1-205115, a detailed description thereof will be omitted.

A "lens driving" subroutine is executed in step #022. In this subroutine, only the drive pulse count of a focus control lens FLNS which is calculated in step #015 or #021 on the camera body CMR side is transmitted to the lens microcomputer LCPU. Thereafter, the lens microcomputer LCPU drives and controls the motor FMTR in accordance with a predetermined acceleration/deceleration curve. When driving is completed, the completion signal is transmitted to the camera microcomputer CCPU, thereby ending this subroutine.

In step #023, the content of the AF counter AFCNT is incremented by one, and the flow returns to step #002.

A release interrupt generated by the ON operation of a switch SW2 during operations in the focus control cycle represented by steps #014 to #023 surrounded by a broken line will be described below.

The switch SW2 is connected to the interrupt input above. When the switch SW2 is turned on, step #031 is immediately executed by an interrupt function even , during execution of any step.

When a switch SW2 interrupt is generated during execution of the steps surrounded by the broken line, the flow advances from step #031 to step #032 to determine whether the current AF mode is the one-shot AF mode. If NO in step #032, the flow advances to the "release" subroutine in step #034, and a release operation is immediately started.

When it is determined in step #032 that the current AF mode is the one-shot AF mode, the content of the in-focus counter JFCNT is determined in step #033. If JFCNT=0, i.e,. if any in-focus state has not been detected yet, the interrupt subroutine returns to the main routine from step #036. The AF operation continues until the first in-focus state is detected. However, if JFCNT≧1, then the release operation is performed in step #034. The "release" subroutine will be described later with reference to FIG. 18.

In step #035, film winding is performed.

Photography of one frame is completed by the above operations, and the flow returns to step #002.

The "release" subroutine will be described with reference to FIG. 18.

A mirror up control of a main mirror MM is performed in step #102 through step #101. This can be executed by controlling the motor MTR2 through the driver circuit MDR2 in FIG. 15.

In step #103, the aperture control value already stored in the "exposure calculation" subroutine in step #013 in FIG. 17 is sent to the lens LNS side to perform aperture down control.

It is determined in step #104 whether the mirror up control and aperture down control respectively performed in steps #102 and #103 are already completed. The mirror up state can be detected by a detection switch (not shown) included in the main mirror MM. The aperture down control is detected by communication to determine whether the lens is driven to satisfy a predetermined aperture value. When either control is not completed, the flow waits in this step, and state detection continues. When the mirror up control and the aperture down control are confirmed, the flow advances to step #015. At this time, exposure preparation is completed.

The time control value stored in the "exposure calculation" subroutine in step #013 is used to control the shutter in step #105 to expose the film.

When the shutter control is completed, a command for setting the aperture open is sent to the lens LNS in step #106. In step #107, mirror down control is performed. This control is performed by controlling a motor MTR2 through a driver circuit MDR2 as in the mirror up control.

Completion of the mirror down control and the open aperture control is awaited in step #108 as in step #104. When both the mirror down control and the open aperture control are completed, the flow advances to step #109, so that the flow returns to the main routine.

An image blur compensation operation performed on the lens LNS side will be described with reference to the flow chart in FIG. 19.

In step #201, when an image blur compensation main switch SWIS is turned on to the power the image blur compensation microcomputer ICPU and its peripheral circuits In step #202, the two integrators INT1 and INT2 are reset, and their outputs v and d are initialized to "0".

An IS start command is determined in step #203. If the IS start command is not sent from the camera body CMR, the flow advances to step #204.

In step #204, the switch SWHP of the high-pass filter HPF is turned on (closed) to discharge the capacitor C. At the same time, charging of the capacitor C is prevented.

In step #205, the switch SWR1 is turned off (open), and "0" is set in a flag FLR representing the state of the switch SWR1.

While any IS start command is not sent, steps #203 to #206 are repeated. In this state, image blur compensation is not performed. However, an acceleration detector ACC and the integrators INT1 and INT2 are operated, and their outputs a, v, and d are kept output.

When an IS start command is sent from the camera body CMR, the flow advances from step #203 to step #211. Information in the AF mode is received from the camera microcomputer CCPU. This communication is part of the communication performed in step #011 of FIG. 17.

In step #212, only the integrator INT2 is reset to "0" due to the following reason. When image blur compensation is started in step #214, the compensation optical system ILNS starts its operation from the origin (i.e., the center of the movable range, i.e., the position where the axis of the system ILNS coincides with the optical axis C in FIG. 7) so as to effectively use the stroke.

In step #213, the switch SWHP is turned off (open) to effect the function of the high-pas filter HPF. At this time, since the switch SWR1·is kept off, the cutoff frequency of the high-pass filter HPF is given as follows:

$$f_1 = \frac{1}{2\pi R_1 C} \text{ [Hz]}$$

The high-pass filter has a characteristic enough to filter even a low-frequency signal.

In step #214, the driver circuit IDR for a motor IMTR is operated. When this circuit is enabled, it receives a signal from the operational amplifier AMP to drive and control the motor IMTR in accordance with the output signal from the operational amplifier AMP. At the start of operation, the output d from the integrator INT2 is kept at "0", an output d' from the high-pass filter HPF is also set at "0". The amplifier AMP, a driver circuit IDR, and the motor IMTR are driven and controlled so that the output from the position sensor PSD becomes "0", i.e., the compensation optical system ILNS becomes the origin (the central position in the movable range). This is called a centering operation. Thereafter, a deviation signal d corresponding to the blur is output from the integrator INT2 and passes through the high-pass filter HPF. An output signal d' from the high-pass filter HPF is input to the amplifier AMP. Therefore, a deviation dL of the compensation optical system ILNS is controlled as follows:

$$dL = d'$$

An image seems to be stationary on the focusing plane, i.e., a focusing screen PG.

It is determined in step #215 whether the AF mode information sent from the camera body CMR represents the one-shot AF mode. If YES in step #215, the flow advances to step #216.

In step #216, the velocity Y as the output from the integrator INT1 is compared with a velocity limit value $v_{th}$. If condition $|v| < v_{th}$ is established, it is determined that only a normal hand vibration has occurred. The flow advances to step #219 through step #218 to determine whether an IS stop command is transmitted from the camera body CMR. If NO in step #219, the flow returns to step #215. The above loop is repeated to continue the normal image blur compensation operation.

If condition $|v| \geq v_{th}$ is satisfied in step #216, as is apparent from the description with reference to FIG. 16A, a change in framing is determined, and the flow advances to step #217. In step #217, the integrator INT2 is reset and at the same time the switch SWHP is turned on. Both the deviation signals d and d' become "0", centering is performed so that the compensation optical system satisfies dL=0. During the period satisfying condition $|v| \geq v_{th}$, the deviation signals d and d' are kept at "0" by a loop of steps #215, #216, #217, #219, and #215. The compensation optical system ILNS is kept at the central position in the movable range. When a change in framing is completed, and condition $|v| < v_{th}$ is established, the flow advances from step #216 to step #218 again to turn off the switch SWHP. The integrator INT2 is not reset to keep outputting the deviation signal d, and therefore a normal image blur compensation operation is restarted.

During the above loop, when an IS stop command is received in step #219, the driver circuit IDR is stopped in step #220. The image blur compensation operation is stopped, and the flow returns to step #203.

A flow of a servo AF mode will be described below.

If it is determined in step #215 that the current AF mode is not the one-shot AF mode, the flow advances to step #221. If it is determined in step #221 that the current AF mode is the servo AF mode, the flow advances to step #222. In step #222, the switch SWR1 of the high-pass filter HPF is turned on (closed) to switch the cutoff frequency of the high-pass filter HPF to a frequency f2 higher than the normal cutoff frequency f1 due to the reason described with reference to 16B.

In step #223, "1" is set in the flag FLR representing the state of the switch SWR1, and the flow advances to step #219.

In the servo AF mode, image blur compensation is performed by the loop of steps #215, #221, #222, #223, #219, and #215. At this time, since the cutoff frequency of the high-pass filter HPF is set to the higher value f2, a response speed to a relatively low-frequency blur such as a change in framing is low, and the high-frequency hand vibration can be properly compensated.

Finally, a flow of a moving object anticipation servo AF mode will be described below.

In the moving object anticipation servo AF mode, NO is determined in steps #215 and #221, and the flow advances to step #231 to determine the state of the flag FLR representing the state of the switch SWR1. In the first cycle of the flow upon turn-ON operation of the switch SW1, since the flag FLR is set to "0" (the switch SWR is kept off) in step #206, the flow advances to step #232. In step #232, the deviation signal d' output from the high-pass filter HPF is compared with the deviation limit value $d_{th}$. When the deviation of blur is smaller than the limit value, i.e., if $|d'| < d_{th}$, the flow advances to step #219 to continue the normal image blur compensation operation.

If condition $|d'| \geq d_{th}$ is established in step #232, i.e., if a large panning action is taken, the flow advances to step #222 to increase the cutoff frequency of the high-pass filter HPF as in the previous servo AF mode so as not to interfere with the panning operation. In this case, even if panning continues, the d' value falls within the predetermined range, and the hand vibration compensation can be continuously performed.

Once the operations in steps #222 and #223 are performed, the flag FLR is set to "1". When the flow returns to step #231, the operation in step #222 must be performed. That is, in the moving object anticipation servo AF mode, when a panning amount is small, the normal image blur compensation operation is performed. However, when a panning amount is increased, the characteristic of the high-pass filter HPF is switched to invalidate image blur compensation for panning.

Figure 12:
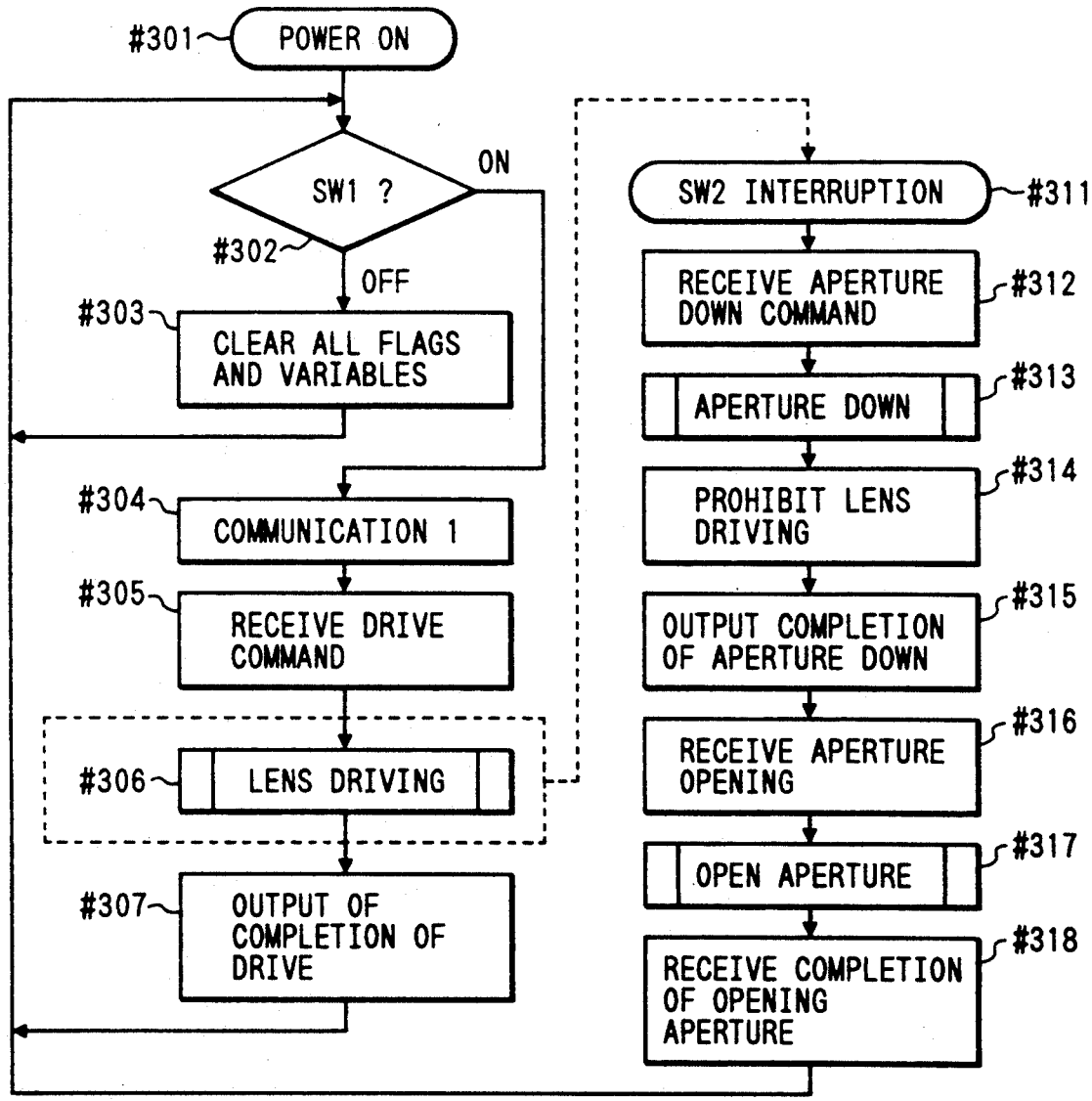

The operation of the lens microcomputer LCPU is the same as that of the flow chart in FIG. 12, and a detailed description thereof will be omitted.

Figure 20:
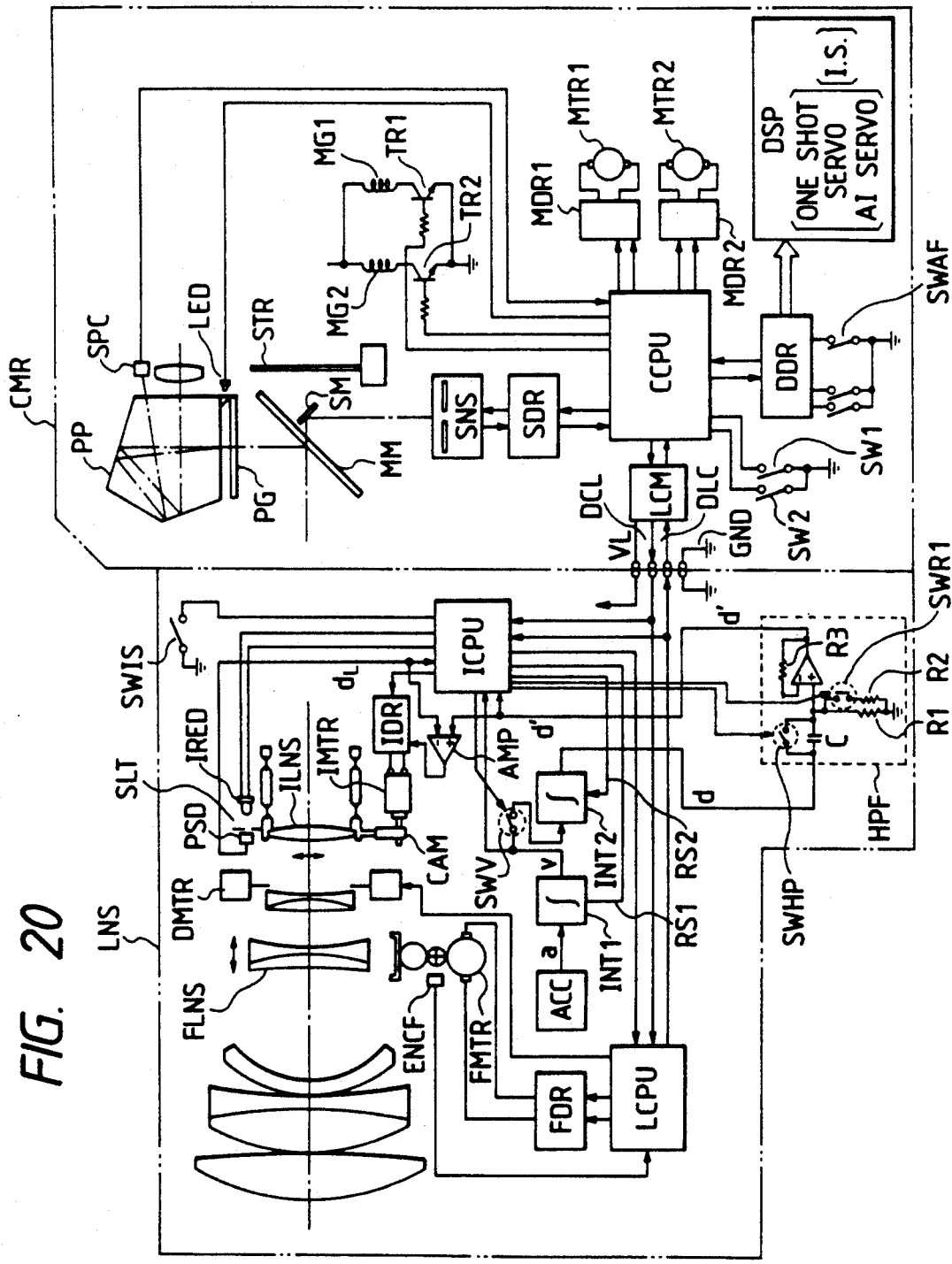
FIG. 20 is a block diagram showing the seventh embodiment of the present invention.
Figure 22:
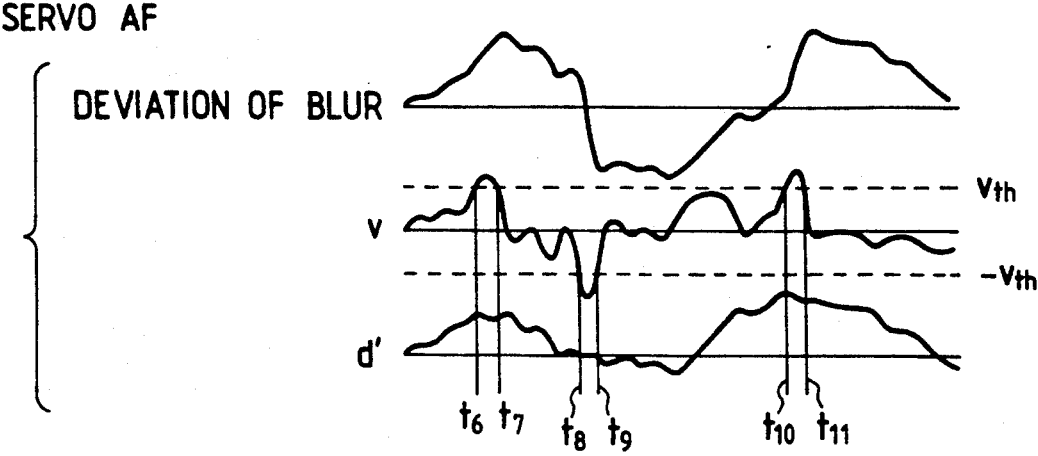
FIG. 22 is a waveform chart for explaining blur compensation in the servo AF mode.

FIGS. 20 to 22 show the seventh embodiment of the present invention.

In the sixth embodiment, the characteristic of the high-pass filter HPF is uniformly switched in the servo AF mode. This operation is effective a moderate change in framing. However, in an abrupt change in framing, a blur contains a high-frequency component. In the initial period of the abrupt change in framing, image blur compensation is effected to often disable smooth change in framing.

In the seventh embodiment, processing similar to that in the one-shot AF mode of the sixth embodiment is performed in the servo AF mode.

FIG. 20 is a diagram showing the main part of the seventh embodiment. The arrangement of the seventh embodiment is almost the same as that of FIG. 15 except that a switching means SWV is arranged between integrators INT1 and INT2 to control filtering of a velocity signal v. The switching means SWV is ON/OFF-controlled by an image blur compensation microcomputer ICPU.

Figure 19B:
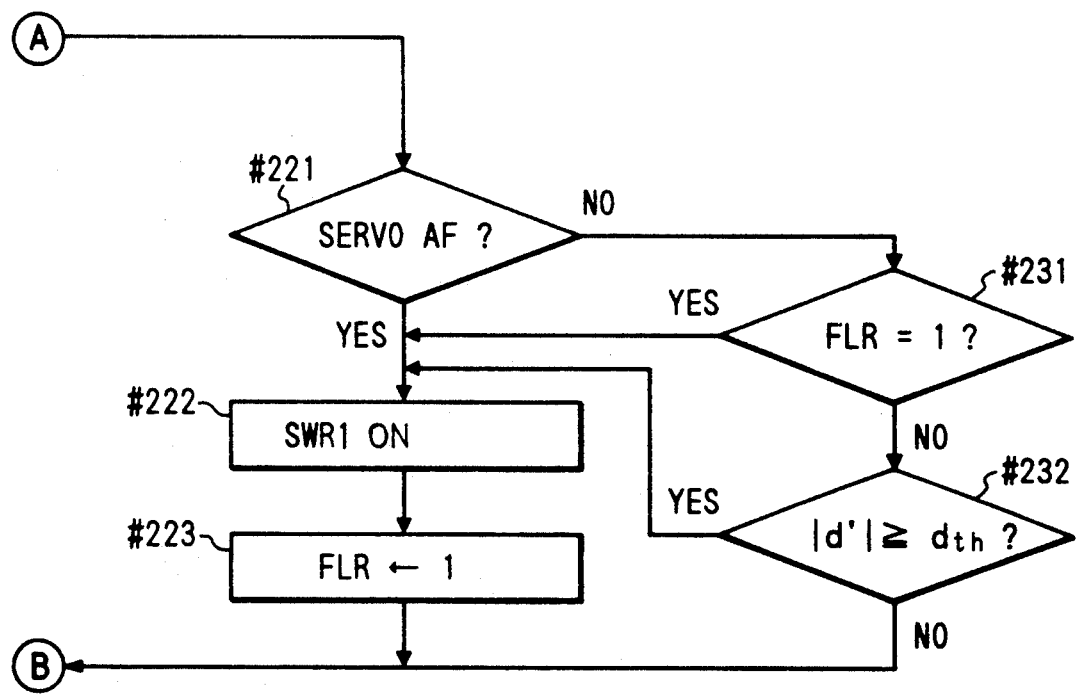

FIG. 21 is a flow chart of an image blur compensation operation of the seventh embodiment and is different from FIG. 19 (sixth embodiment) in that step #207 is added next to step #206 and a flow of the servo AF mode from step #221 is different from that of FIG. 19. Therefore, only different parts will be described below.

In step #203, when an IS start command is not received, the switching means SWV is turned on (closed) in step #207 upon completion of steps #203, #204, #205, and #206 to allow input of the velocity signal v to the integrator INT2.

When the IS start command is received, the flow reaches step #221 through steps #211 to #215. When the advances to step #241.

In step #241, the velocity v is compared with a limit value $v_{th}$. If condition $|v| < v_{th}$ is satisfied, the flow advances to step #219 through step #242 to continue a normal image blur compensation. However, if condition $|v| \geq v_{th}$ is satisfied in step #241, i.e., if a change in framing is determined, the switching means SWV is turned off (open) in step #243. An input to the integrator INT2 is interrupted, and its output d is fixed to a value immediately before the switching means SWV is turned off. An output d' from the high-pass filter HPF is attenuated by a time constant defined by a cutoff frequency f1.

The loop of steps #215, #221, #241, #243, #219, and #215 is repeated. During this repetition, since the output d' is kept attenuated, a compensation optical system ILNS is also deviated toward the center in the movable range. If condition $|v| < v_{th}$ is established during the loop, the flow advances from step #241 to step #242. Therefore, the image blur compensation operation performed upon turn-ON operation of the switching means SWV is restarted.

FIG. 22 shows this operation.

Panning is detected during time intervals between time $t_6$ and time $t_7$, between time $t_8$ and time $t_9$, and between time $t_{10}$ and time $t_{11}$. During these time intervals, the input of the velocity signal v is inhibited, and a deviation is not integrated.

Unlike the one-shot AF mode of the sixth embodiment (FIG. 16A), centering of the compensation optical system ILNS is performed if condition $|v| \geq v_{th}$ is established in FIG. 16A. In the seventh embodiment, however, centering is not performed. When a photographer observes an image through a finder, an abrupt movement of the image by centering does not occur, and continuity of the image is maintained.

In the seventh embodiment, the flow of the moving object anticipation servo AF mode is the same as that of the sixth embodiment. Steps #222 and #223 in FIG. 19 are replaced with steps #233 and #234 in FIG. 21.

Figure 24:
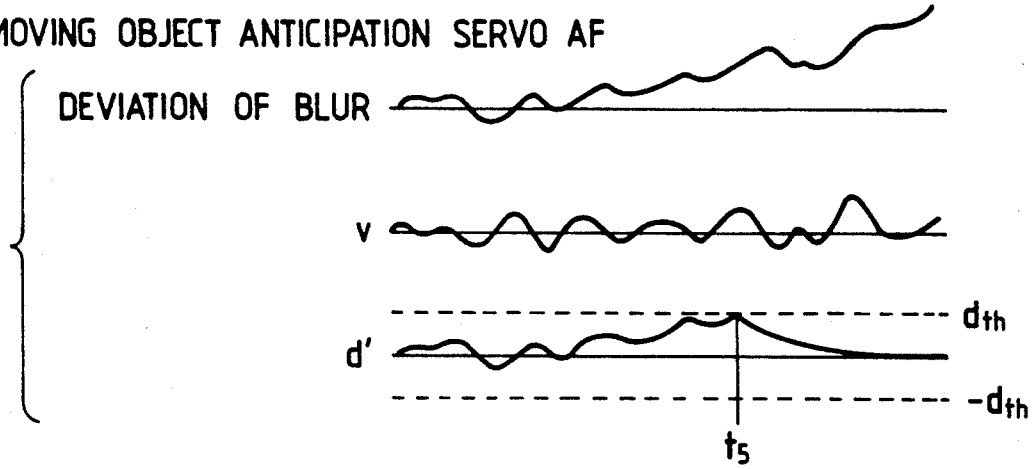
FIG. 24 is a waveform chart for explaining blur compensation in the moving object anticipation servo AF mode.
Figure 25:
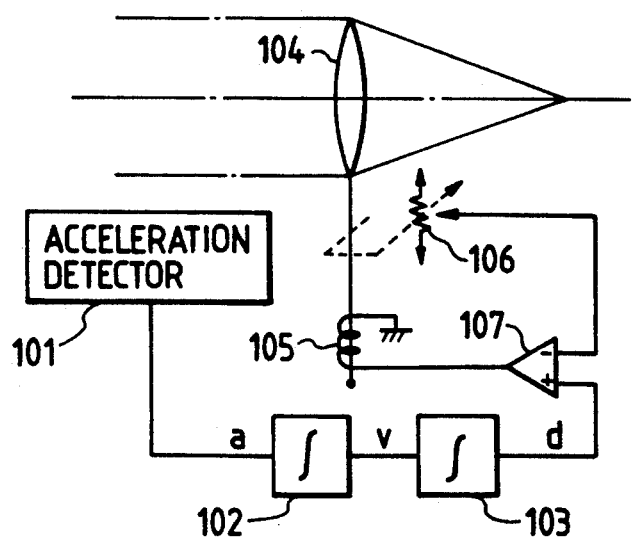
FIG. 25 is a schematic diagram showing a conventional image blur compensation device.
Figure 23B:
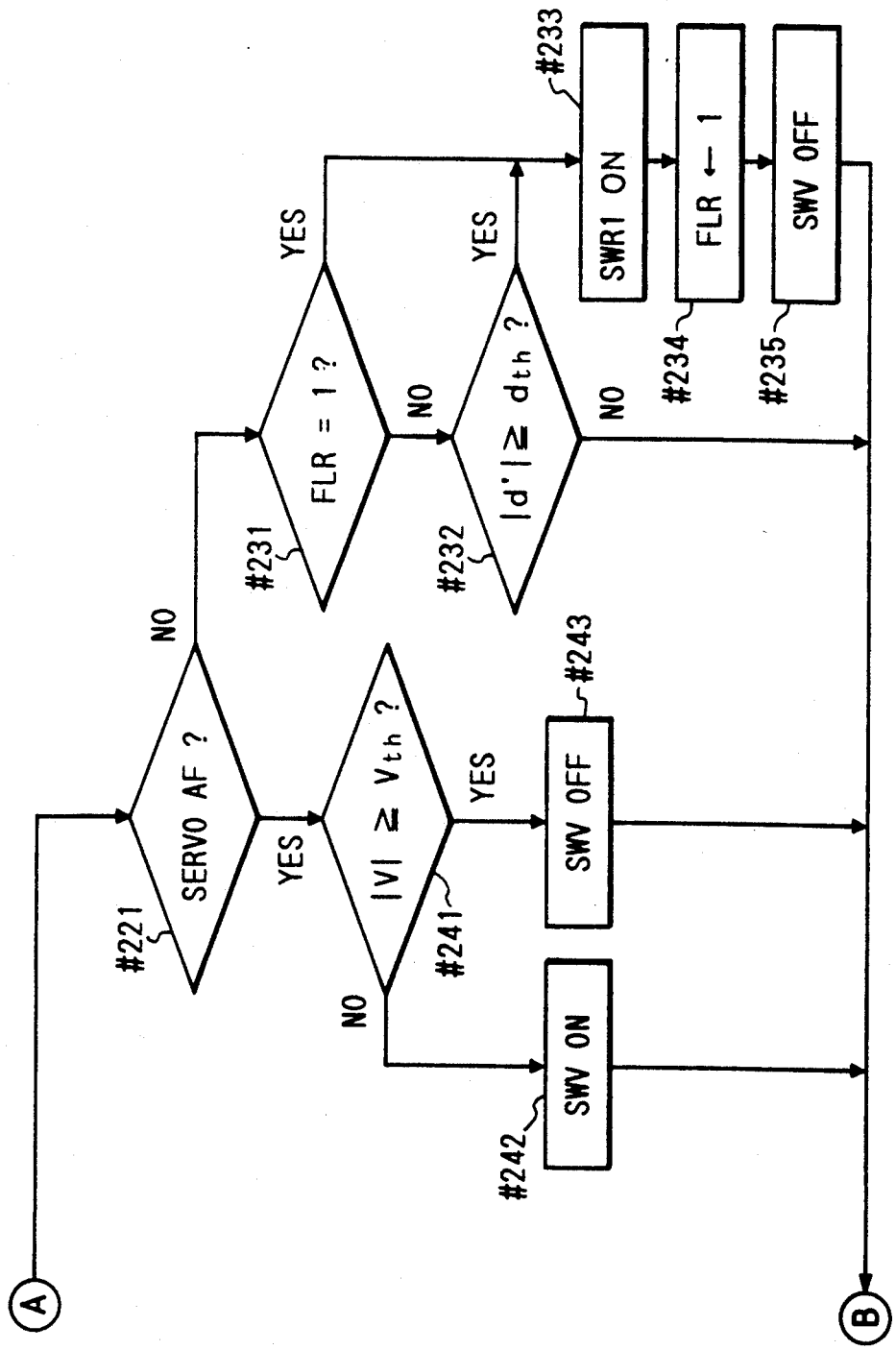

FIGS. 23 and 24 show the eighth embodiment of the present invention.

In the sixth and seventh embodiments, in the moving object anticipation servo AF mode, when the deviation d' caused by panning exceeds a predetermined value, the characteristic of the high-pass filter HPS is changed, and blur compensation is not performed for a low-frequency blur. However, when a panning amount is large, the camera is moved to follow a moving object so as to create a "flowing" effect. In this case, it In the eighth embodiment, when a deviation d' exceeds a limit value $d_{th}$, image blur compensation is inhibited.

FIG. 23 is a flow chart of an image blur compensation operation in the eighth embodiment. The flow chart of this embodiment is almost the same as that of the seventh embodiment shown in FIG. 21 except that step #235 is added next to step #234.

If condition $|d'| \geq d_{th}$ is satisfied in step #232, a switch SWR is turned on to change the characteristic of a high-pass filter HPF in step #233, and "1" is set in a flag FLR in the next step #234. A switching element SWV is turned off in step #235 to inhibit the input of a velocity v to an integrator INT2.

A compensation optical system ILNS is slowly moved toward the center of the movable range in accordance with a time constant corresponding to a cutoff frequency f2 of the high-pass filter HPF.

In each of the embodiments shown in FIGS. 15 to 24, in a camera having a plurality of AF modes, the set AF mode is determined, and image blur compensation operations corresponding to the respective AF modes shown in FIGS. 16A to 16C, 22, and 24 are performed. Image blur compensation suitable for conditions given by the hand vibration and the change in framing (panning) during observation through the finder or during photography can be performed. Hand blur compensation can be accurately performed without degrading operability of the change in framing (panning).

In each of the embodiments of FIGS. 15 to 24, the flow of the servo AF mode is different from that of the moving object anticipation servo AF mode. However, these two flows may be identical to each other. In addition, a camera need not have the moving object anticipation servo AF mode. In addition, the AF mode is set by an external operation switch. However, the AF mode may be automatically switched in accordance with a plurality of previous focus detection operations.

In each of the embodiments shown in FIGS. 15 to 24, the characteristic of the high-pass filter HPF is changed as a method of changing an image blur compensation characteristic. However, any other method such as a change in integration frequency range of an integrator may be employed.

The above embodiments may be appropriately combined with each other.

The present invention is not limited to the particular embodiments described above. For example, the present invention is applicable to another photometry mode or another focus mode.

What is claimed is:

1. An image stabilizing device comprising:
   (A) image stabilizing means for preventing an image blur;
   (B) photometry means operable in at least a first photometry mode in which photometry is performed for a first photometry area and a second photometry mode in which photometry is performed for a second photometry area; and
   (C) control means for changing a function of said image stabilizing means in accordance with the photometry mode in which said photometry means is operated.

2. A device according to claim 1, wherein said first photometry area is smaller than said second photometry area.

3. A device according to claim 1, wherein said control means includes variable means which decreases a response characteristic for vibration at a lower frequency side of said image stabilizing means in response to said photometry means being operated in said first photometry mode.

4. A device according to claim 2, wherein said control means includes restriction means which restricts the function of said image stabilizing means in response to said photometry means being operated in said first photometry mode.

5. A device according to claim 2, wherein said control means includes cancellation means which cancels the function of said image stabilizing means in response to said photometry means being operated in said first photometry mode.

6. A device according to claim 3, wherein said control means includes means for canceling a function of said variable means during photography.

7. A device according to claim 4, wherein said control means includes means for canceling a function of said variable means during photography.

8. A device according to claim 5, wherein said control means includes means for canceling a function of said restriction means during photography.

9. An image stabilizing device, comprising:
   (A) image stabilizing means for preventing an image blur;
   (B) auto-focusing means operable in a plurality of focusing modes; and
   (C) control means for varying function of said image stabilizing means in accordance with the focusing mode in which said auto-focus means is operated.

10. A device according to claim 9, wherein said focusing modes include a focusing mode in which focusing position is determined based on a single focus detection result and a second focusing mode in which focusing position is determined based on a plurality of focus detection results.

11. A device according to claim 10, wherein said control means includes restriction means which restricts the function of said image stabilizing means when said auto-focusing means performs focusing by operation thereof in said second focusing mode.

12. A device according to claim 11, wherein said control means includes means for canceling a function of said variable means during photography.

13. A device according to claim 10, wherein said control means includes cancellation means for cancelling the operation of said image stabilizing means when said auto-focusing means performs focusing by operation thereof in said second focusing mode.

14. A device according to claim 13, wherein said control means includes means for canceling a function of said restriction means during photography.

15. A device according to claim 9, wherein said focusing modes include a one-shot auto-focusing mode in which the focus detection operation is completed with a single focus detection operation.

16. A device according to claim 9, wherein said focusing modes include a servo auto-focusing mode in which the focus detection operation is successively performed.

17. A device according to claim 9, wherein said focusing modes include a moving object anticipation focusing mode.

18. A device according to claim 15, wherein said control means includes means for invalidating the function of said image stabilizing means when the velocity of blur exceeds a predetermined value in a one-shot autofocus mode.

19. A device according to claim 16, wherein said control means includes means for decreasing a low-frequency blur response to said image stabilizing means in a servo autofocus mode.

20. A device according to claim 16, wherein said control means includes means for invalidating the function of said image stabilizing means when a velocity of blur exceeds a predetermined value in a servo autofocus mode.

21. A device according to claim 17, wherein said control means includes means for decreasing a low-frequency blur response of said image stabilizing means when a deviation of blur exceeds a predetermined value in a moving object anticipation servo autofocus mode.

22. A device according to claim 17, wherein said control means includes means for invalidating the function of said image stabilizing means when a deviation of blur exceeds a predetermined value in a moving object anticipation servo autofocus mode.

23. A device according to claim 17, wherein said control means includes means for resetting said image stabilizing means to an initial state when a deviation of blur exceeds a predetermined value in a moving object anticipation focusing mode.

24. A device according to claim 15, wherein said control means includes means for resetting said image stabilizing means to an initial state when a velocity of blur exceeds a predetermined value in a one-shot autofocus mode.

25. A device according to claim 9, wherein said control means includes means for changing a low-frequency blur response of said image stabilizing means.

26. A device according to claim 9, wherein said control means includes means for validating the function of said image stabilizing means.

27. A camera, comprising:
(A) image stabilizing means for preventing an image blur;
(B) photometry means operable in at least a first photometry mode in which photometry is performed for a first photometry area and a second photometry mode in which photometry is performed for a second photometry area; and
(C) control means for changing a function of said image stabilizing means in accordance with the photometry mode in which said photometry means is operated.

28. A camera according to claim 27, wherein said first photometry area is smaller than said second photometry area.

29. A camera according to claim 28, wherein said control means includes variable means which decreases a response characteristic for vibration at a lower frequency side of said image stabilizing means in response to said photometry means being operated in said first photometry mode.

30. A camera according to claim 28, wherein said control means includes restriction means which restricts the function of said image stabilizing means in response to said photometry means being operated in said first photometry mode.

31. A camera according to claim 28, wherein said control means includes cancellation means which cancels the function of said image stabilizing means in response to said photometry means being operated in said first photometry mode.

32. A camera, comprising:
(A) image stabilizing means for preventing an image blur;
(B) auto-focusing means operable in a plurality of focusing modes; and
(C) control means for varying function of said image stabilizing means in accordance with the focusing mode in which said auto-focus means is operated.

33. A camera according to claim 32, wherein said focusing modes include a first focusing mode in which focusing position is determined based on a single focus detection result and a second focusing mode in which focusing position is determined based on a plurality of focus detection results.

34. A camera according to claim 33, wherein said control means includes restriction means which restricts the function of said image stabilizing means when said auto-focusing means performs focusing by operation thereof in said second focusing mode.

35. A camera according to claim 33, wherein said control means includes cancellation means for cancelling the operation of said image stabilizing means when said auto-focusing means performs focusing by operation thereof in said second focusing mode.

36. A camera according to claim 32, wherein said focusing modes include a one-shot auto-focusing mode in which the focus detection operation is completed with a single focus detection operation.

37. A camera according to claim 32, wherein said said focusing modes include a servo auto-focusing mode in which the focus detection operation is successively performed.

38. A camera according to claim 32, wherein said focusing modes include a moving object anticipation focusing mode.

* * * * *

UNITED STATES PATENT AND TRADEMARK OFFICE
CERTIFICATE OF CORRECTION

PATENT NO. : 5,231,445

DATED : July 27, 1993

INVENTOR(S) : Ichiro Onuki and Toshiyuki Kumakura

It is certified that error appears in the above-identified patent and that said Letters Patent is hereby corrected as shown below:

Col. 2, line 62, Change "cannot often" to -- often cannot --

Col. 4, line 35. Change "contact a" to -- contact c --

Col. 4, lines 40, 43. Delete "an"

Col. 5, line 6. Change "a" to -- v --

Col. 5, line 9. Change "signal a" to -- signal p --

Col. 5, line 47. Delete "." second occurrence

Col. 8, line 43. Delete "such"

Col. 10, line 58. After "FLNS" insert -- and --

Col. 11, line 9. Delete "1"

Col. 11, lines 38, 41. Change "signal a" to -- signal v --

Col. 12, line 44. Delete "."

Col. 15, line 7. Delete "then"

Col. 15, line 50. Change "DEEPCNT" to -- DEPCNT --

Col. 17, line 15. Change "#137" to -- #037 --

Col. 17, line 53. Delete "." second occurrence

Col. 21, line 6. Change "describe" to -- described --

Col. 21, line 55. Change "d" to -- d' --

Col. 22, line 52. Change "much" to -- very --

Col. 22, line 63. Change "continuous" to -- continuously --

Col. 23, line 19. After "with" insert -- reference to Figs. 15, 16A to 16C, and flow charts from --

Col. 23, line 41. Delete "a"

UNITED STATES PATENT AND TRADEMARK OFFICE
CERTIFICATE OF CORRECTION

PATENT NO. : 5,231,445

DATED : July 27, 1993

INVENTOR(S) : Ichiro Onuki and Toshiyuki Kumakura

It is certified that error appears in the above-identified patent and that said Letters Patent is hereby corrected as shown below:

Col. 24, line 54.  After "input" insert -- terminal of the camera microcomputer CCPU, as described --

Col. 24, line 56.  Delete ","

Col. 26, line 17.  Change "high-pas" to -- high-pass --

Col. 26, line 54.  Change "Y" to -- v --

Col. 27, line 6.  Change "#215" to -- #220 --

Col. 28, line 10.  After "effective" insert -- in --

Col. 28, line 41.  After "the" insert--servo AF mode is determined in step #221, the flow --

Col. 29, line 22.  After "it" insert -- is often better not to perform image blur compensation --

Col. 30, line 22.  Change "1" to -- 2 --

Col. 30, line 56.  After "a" insert -- first --

Signed and Sealed this

Third Day of May, 1994

Attest:

BRUCE LEHMAN

Attesting Officer

Commissioner of Patents and Trademarks